(12) United States Patent
Gooding

(10) Patent No.: US 8,464,747 B2
(45) Date of Patent: Jun. 18, 2013

(54) STEAM TRAP

(76) Inventor: Harold S. Gooding, Nahant, MA (US)

( * ) Notice: Subject to any disclaimer, the term of this patent is extended or adjusted under 35 U.S.C. 154(b) by 738 days.

(21) Appl. No.: 12/529,605

(22) PCT Filed: Feb. 28, 2008

(86) PCT No.: PCT/US2008/002638
§ 371 (c)(1),
(2), (4) Date: Mar. 16, 2010

(87) PCT Pub. No.: WO2008/108967
PCT Pub. Date: Sep. 12, 2008

(65) Prior Publication Data
US 2010/0193047 A1    Aug. 5, 2010

Related U.S. Application Data

(60) Provisional application No. 60/892,578, filed on Mar. 2, 2007, provisional application No. 60/911,382, filed on Apr. 12, 2007.

(51) Int. Cl.
*F16T 1/02*    (2006.01)

(52) U.S. Cl.
USPC .......................................... 137/184; 137/187

(58) Field of Classification Search
USPC ........................................ 137/184, 183, 187
See application file for complete search history.

(56) References Cited

U.S. PATENT DOCUMENTS

| | | | | |
|---|---|---|---|---|
| 796,516 | A | * | 8/1905 | Humphrey .................... 137/184 |
| 3,625,442 | A | | 12/1971 | DiMeglio |
| 4,134,541 | A | * | 1/1979 | Beatty .............................. 236/56 |
| 4,708,157 | A | * | 11/1987 | Sabatino ....................... 137/179 |
| 4,745,964 | A | | 5/1988 | Mower et al. |
| 5,890,510 | A | | 4/1999 | Mason |

* cited by examiner

*Primary Examiner* — Craig Schneider
(74) *Attorney, Agent, or Firm* — Hamilton IP Law, PC; Jay R. Hamilton; Charles A. Damschen

(57) ABSTRACT

A steam trap system including a steam trap having a steam inlet and a water collector that can collect water. An orifice arrangement is included having a plurality of valved orifices spaced apart from each other at different heights. Selected valved orifices can be configured to open as water in the water collector rises and reaches the height of the selected valved orifices, allowing the water to be removed from the water collector.

8 Claims, 28 Drawing Sheets

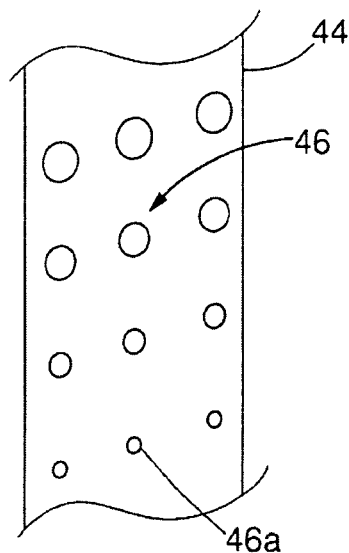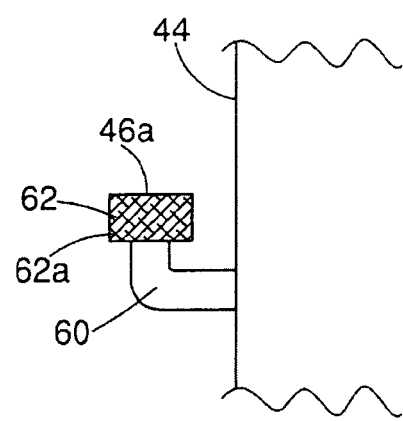
FIG. 9  FIG. 11
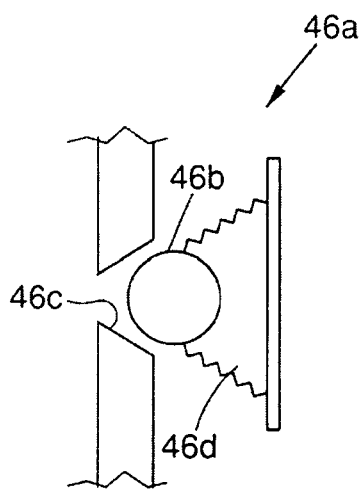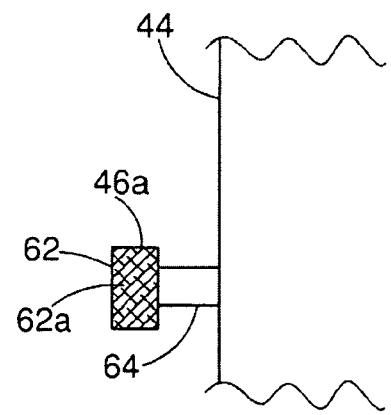
FIG. 10  FIG. 12

STEAM TRAP

RELATED APPLICATIONS

Applicant Harold S. Gooding, IV, a citizen and resident of the United States of America, requests entry into the National Phase in the United States by and through this application which is based on a PCT Patent Application, assigned serial number PCT/US2008/002638 filed on Feb. 28, 2008 which claimed the benefit of U.S. Provisional Application No. 60/911,382, filed on Apr. 12, 2007 and U.S. Provisional Application No. 60/892,578, filed on Mar. 2, 2007. The entire teachings of the above applications are incorporated herein by reference.

BACKGROUND

A steam system typically includes steam traps for removing water at various locations in the system, which if not removed, can be accelerated in the system, causing water hammer and damage. A steam trap removes the water through an orifice. Typically, the orifices are oversized to accommodate a variety of situations so that water hammer will never occur. However, this also removes more steam than necessary from the system, which reduces the efficiency of the system, requires more fuel to be used for heating more water, and is more costly.

SUMMARY

The present invention can provide a steam trap system which can operate more efficiently, thereby reducing the cost of operating a steam system. The steam trap system can include a steam trap having a steam inlet. A water collector can collect water. An orifice arrangement can have a plurality of, or at least two valved orifices, spaced apart from each other at different heights. Selected valved orifices can be configured to open as water in the water collector rises and reaches the height of the selected valved orifices, allowing the water to be removed from the water collector. In particular embodiments, each valved orifice can include a thermostatically operated valve member. In one embodiment, the valved orifices can be positioned laterally next to each other at different heights. In some embodiments, the orifice arrangement can include an orifice member extending upwardly in the water collector. A debris collector that automatically drains can be included. Particular valved orifices can discharge both water and gases. Each valved orifice can be configured to be one of a failed closed and failed open orifice. The valved orifices can all fail closed, all fail open, or can be a combination of both. In some embodiments, at least one valved orifice can be configured to fail open as a safety factor. Each valved orifice can include a filter. The valved orifices can be set to open at predetermined temperatures which can increase with increasing height on the orifice arrangement. At least one valved orifice can discharge water into a reservoir of water to reduce flash steam. A heat exchanger can lower temperature of flow prior to entering the valved orifices. A water hammer protection structure can be included. At least one valved orifice of the plurality of valved orifices can have an increased size. The valved orifices can increase in size moving upwardly.

The steam trap can be a first steam trap and the steam trap system can further include a second steam trap connected in parallel with the first steam trap. A valve system can control flow into the first and second steam traps. The valve system can automatically switch the flow from one steam trap to the other when one steam trap does not operate properly.

The present invention can also provide an air purge device including an inlet and an orifice arrangement downstream from the inlet having a plurality of individually operated valved orifices. The valved orifices can be configured to open when exposed to air to purge air and close when exposed to steam.

In particular embodiments, the valved orifices can have a combined orifice area that can be at least equal to the area of the inlet for rapid purging. The air purge device can be positioned upstream of a steam trap. The valved orifices can be thermostatic valves and can be configured to fail closed.

The present invention can also provide a method of removing water with a steam trap system including providing a steam trap having an inlet. Water can be collected with a water collector. The water can be removed from the water collector with an orifice arrangement. The orifice arrangement can have a plurality of, or at least two valved orifices, spaced apart from each other at different heights. Selected valved orifices can be configured to open as the water in the water collector rises and reaches the height of the selected valved orifices, allowing the water to be removed from the water collector.

In particular embodiments, each valved orifice can be configured to be a thermostatically operated valve. In one embodiment, the valved orifices can be positioned laterally next to each other at different heights. In some embodiments, an orifice member can extend upwardly in the water collector. Debris can be collected with a debris collector that automatically drains. Water and gases can be both discharged with particular valved orifices. Each valved orifice can be configured to be one of a failed closed and failed open orifice. The valved orifices can all fail o closed, all fail open, or can be a combination of both. In some embodiments, at least one valved orifice can be configured to fail open. Each valved orifice can be provided with a filter. The valved orifices can be opened at set predetermined temperatures which can increase with increasing height on the orifice arrangement. Water can be discharged from at least one valved orifice into a reservoir of water to reduce flash steam. Temperature of the flow can be lowered with a heat exchanger prior to entering the valved orifices. A water hammer protection structure can be provided. At least one valved orifice of the plurality of valved orifices can be provided with an increased size. In one embodiment, the valved orifices can have increasing size moving upwardly.

The steam trap can be a first steam trap and a second steam trap can be connected in parallel with the first steam trap. Flow into the first and second steam traps can be controlled with a valve system. The flow from one steam trap to the other can be automatically switched with the valve system when one steam trap does not operate properly.

The present invention can also provide a method of purging air from a steam line including providing an air purge device having an inlet. Air entering the inlet can be purged with an orifice arrangement positioned downstream from the inlet and having a plurality of individually operated valved orifices. The valved orifices can be configured to open when exposed to air and close when exposed to steam.

In particular embodiments, the valved orifices can have a combined orifice area that can be at least equal to the area of the inlet. The air purge device can be positioned upstream of a steam trap. Each valved orifice can be configured to be a thermostatically operated valve and can be configured to fail closed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is a schematic drawing of a portion of an orifice member.

FIG. 10 is a schematic drawing of an embodiment of a valved orifice.

FIGS. 11 and 12 are partial side views of other embodiments of valved orifice configurations.

DETAILED DESCRIPTION

Figure 1:
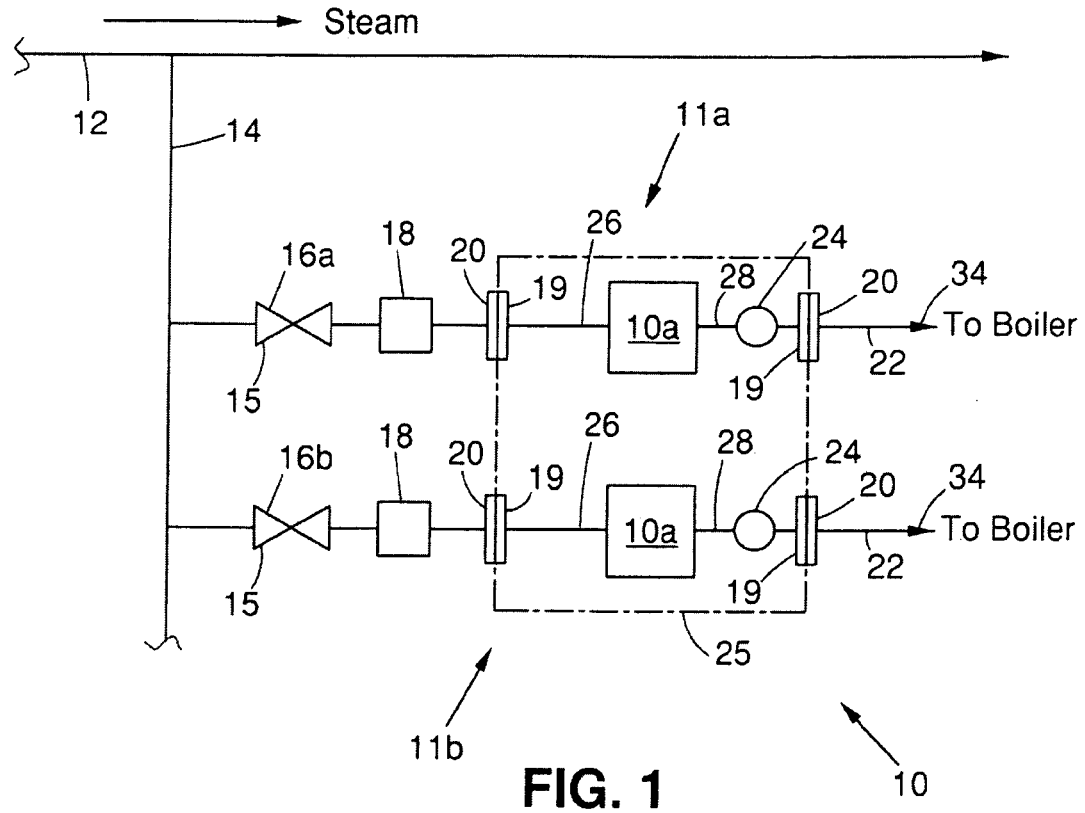
FIG. 1 is a schematic drawing of an embodiment of a steam trap system in the present invention.

Referring to FIG. 1, steam trap system 10 can be connected to a steam line 12 by a vertical line 14 for removing condensate or water 34 from the steam line 12. The steam trap system 10 can have two parallel horizontal steam trap legs 11a and 11b, having steam traps 10a downstream from valves 16a and 16b, where one leg 11a can be operated while the valve 16a is open. The other valve 16b can be closed, so that leg 11b is isolated and not in operation. If after some time, leg 11a does not function properly (for example, steam trap 10a becomes clogged), valve 16b can be opened and valve 16a can be closed, either manually or automatically (for example, a solenoid valve) to switch operation to leg 11b for continued water removal. The leg 11a can then be repaired, for example, the steam trap 10a can be replaced or repaired. This can be done later on a maintenance schedule or right away if desired. A whistle, indicator light, or control panel can indicate that one of the legs 11a or 11b has stopped operating properly.

Each leg 11a and 11b can include a water hammer protection structure or arrangement 18, which can include one or more turns, and/or paths, for blocking accelerating water 34. One embodiment as shown, is formed by connecting fittings together to form two flow paths in a generally square or rectangular configuration which split apart and then come back together. In other embodiments, multiple square, or rectangular configurations, or other configurations with turns can be assembled together, for example, in series or parallel. A steam trap 10a can be positioned downstream for removing water 34 from the system. The water 34 that is removed by the steam trap 10a can be recirculated by line 22 back to the water boiler for reheating back into steam. A water meter 24 can be included for determining the amount of water 34 being returned. The inlets 26 and outlets 28 of the steam traps 10a can be connected to mounting flanges 19 which can be removably mounted to mounting flanges 20 at upstream and downstream ends. The two steam traps 10a can be included in an assembly 25 which can be mounted in place. The flanges 19 and 20 can be sealed with seals such as "O"rings or gaskets, and bolted together. Flanges 20 can be spaced a standard distance apart to enable easy mounting of an assembly without requiring screwing and unscrewing pipe threads. The assembly 25, if desired, can have more than two legs 11a and 11b or only one. Furthermore, more than one leg can be operated simultaneously. In addition, the flanges 19 can be positioned so that only a steam trap 10a is therebetween, or alternatively to have any number of components therebetween.

Figure 2:
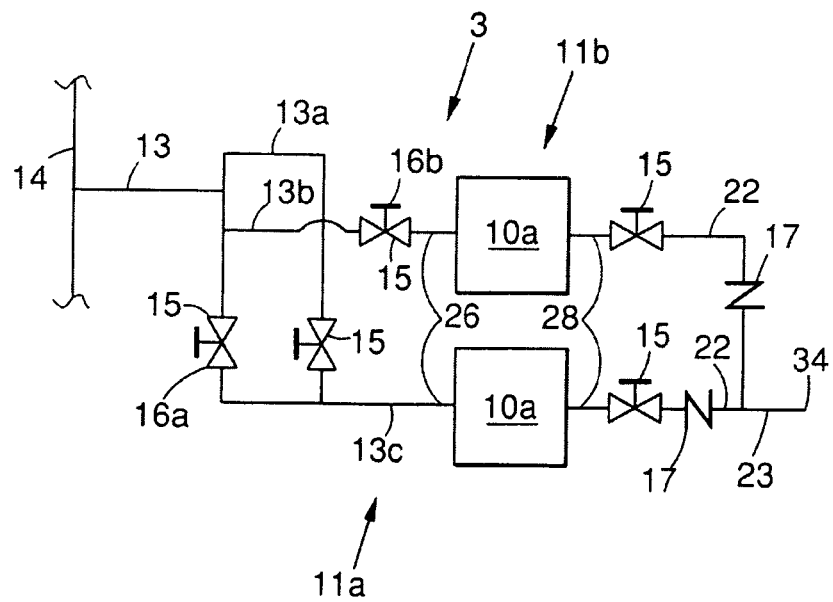
FIGS. 2 and 3 are schematic drawings of another embodiment of a steam trap system.
Figure 3:
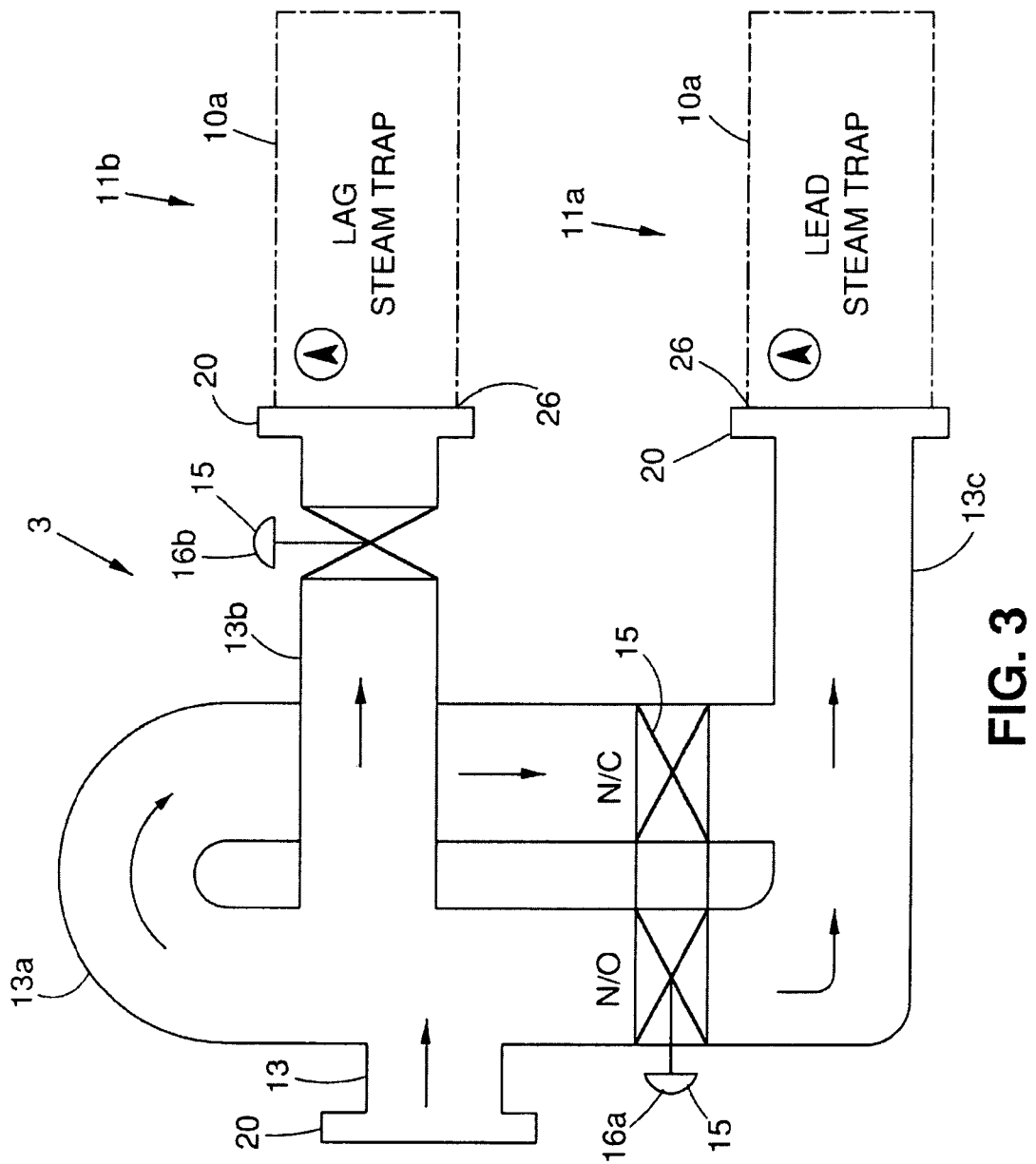

FIGS. 2 and 3 depict a piping and valving configuration to obtain a lead/lag piping arrangement for an automatic cascading redundant steam trap system (or other temperature sensitive applications with a steam system), providing a backup solution for a failed steam trap. Steam trap system 3 can have a horizontal line 13 extending from vertical line 14 to an overflow loop configuration 13a which can be generally rectangular. Steam trap leg 11a and its steam trap 10a can be in communication with loop 13a by line 13c. Valves 15 and 16a can be positioned on the bottom vertical legs of the loop 13a, and on line 22 for isolating the steam trap of leg 10a or 11a on upstream and downstream sides. A valve 17 such as a check valve can also be positioned downstream of steam trap 10a on line 22. Steam trap leg lib and its steam trap 10a can be connected to the loop 13a, such as at the upstream side of the loop 13a, by line 13b. The steam trap 10a of leg 11b can be isolated on upstream and downstream sides by valves 16b and 15 positioned on line 13b and line 22. A valve 17 can also be positioned on line 22 of leg 11b. The lines 22 of legs 11a and 11b can be joined at outlet or drain line 23 for recirculating back to the boiler. The valves 16a and 15 of loop 13a can normally open and normally closed, respectively, to allow operation of the lead steam trap 10a of leg 11a, and can be normally closed and normally open, respectively, to allow operation of the lag steam trap 10a of leg 11b. The other valves 15 associated with legs 11a and 11b are opened or closed depending upon the operation or shut down of the respective legs 11a or 11b. Valves 15, 16a and 16b, can be automatically or manually operated, and can provide isolation and/or control flow rate. Lines 13, 13b and 13c can include mounting flanges 20. Depending upon the situation, the legs 11a and 11b can fail open or closed.

Figure 4:
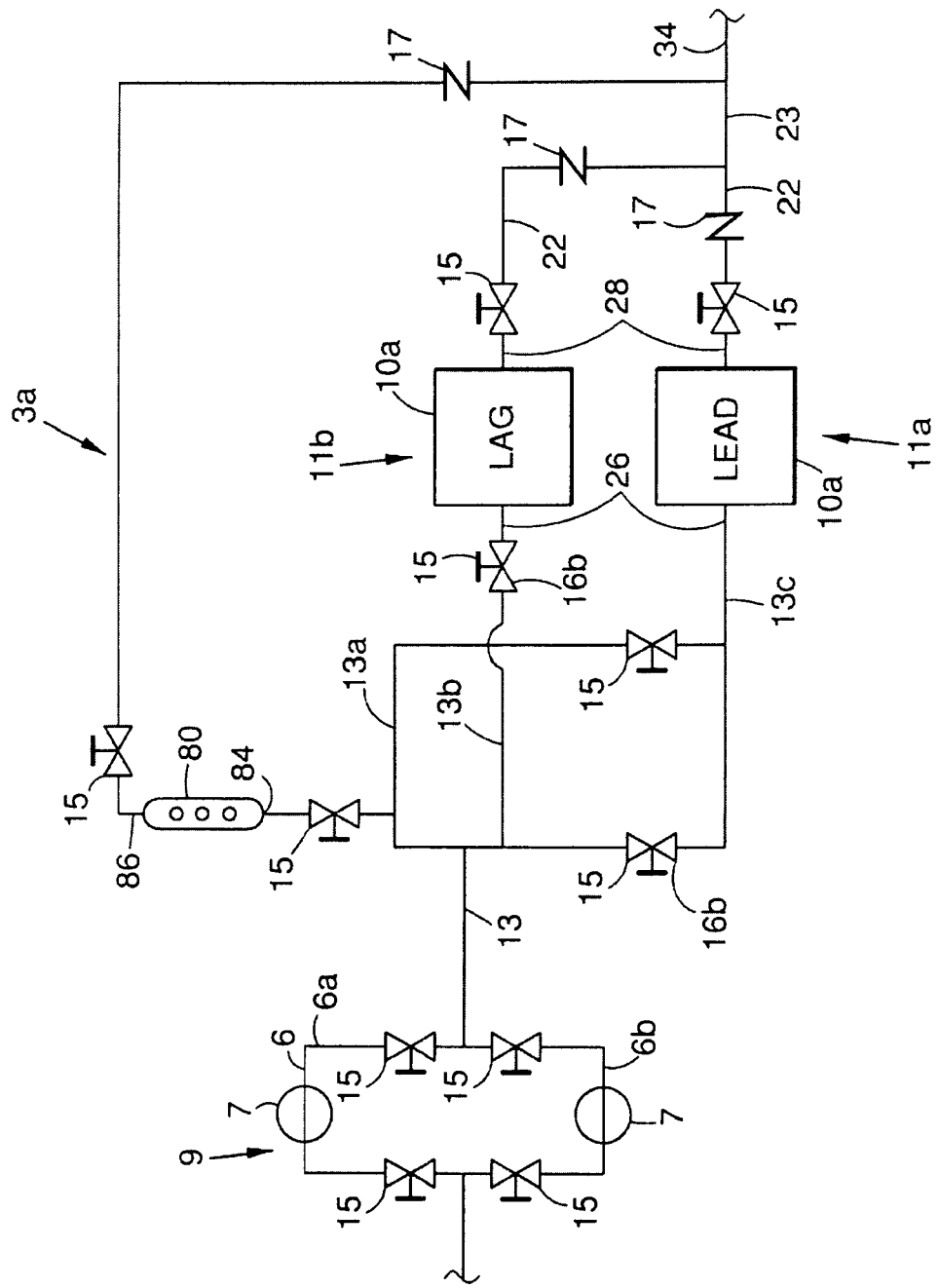
FIG. 4 is a schematic drawing of yet another embodiment of a steam trap system.

Referring to FIG. 4, steam trap system 3a differs from steam trap system 3 in that line 13 can include a straining arrangement 9. The straining arrangement 9 can have a duplex configuration and include a loop configuration 6, which can be generally rectangular, with first 6a and second 6b paths or halves, each containing a strainer 7 for straining debris, contaminants or particles. Valves 15 can be positioned on upstream and downstream sides of each strainer 7 for isolation, for example, for operating only one strainer 7 at a time or for maintenance or replacement. One strainer 7 can be operated while the other is replaced.

Alternatively, both strainers 7 in the duplex configuration can be operated simultaneously. A high volume or power air purge device 80 can be connected to loop 13a by an inlet 84 for quickly purging air from the system 3a, upstream of the steam traps 10a. The outlet 86 of the air purge device 80 can be connected to line 23. Valves 15 can be positioned on the upstream and downstream sides of air purge device 80 for isolating the air purge device 80. The outlet 86 can also include a valve 17, such as a check valve.

Figure 5:
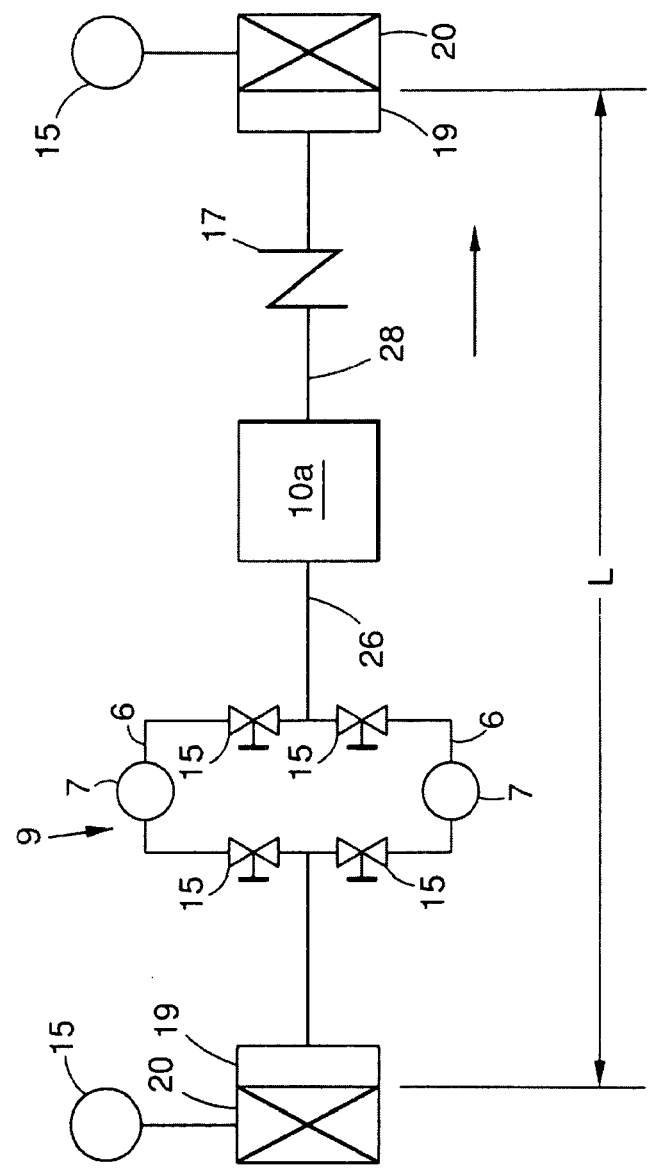
FIG. 5 is a schematic drawing of still another embodiment of a steam trap system.

FIG. 5 depicts another combination of components that can be included between the mounting flanges 19 depicted in FIG. 1. For example, a straining arrangement 9, steam trap 10a and check valve 17 can be positioned between mounting flanges 19, and can be at a standard length L, allowing for easy replacement with another unit having the same standard length L. If desired, a second steam trap 10a arrangement can be included. The flanges 20 can include isolation valves 15.

Figure 6:
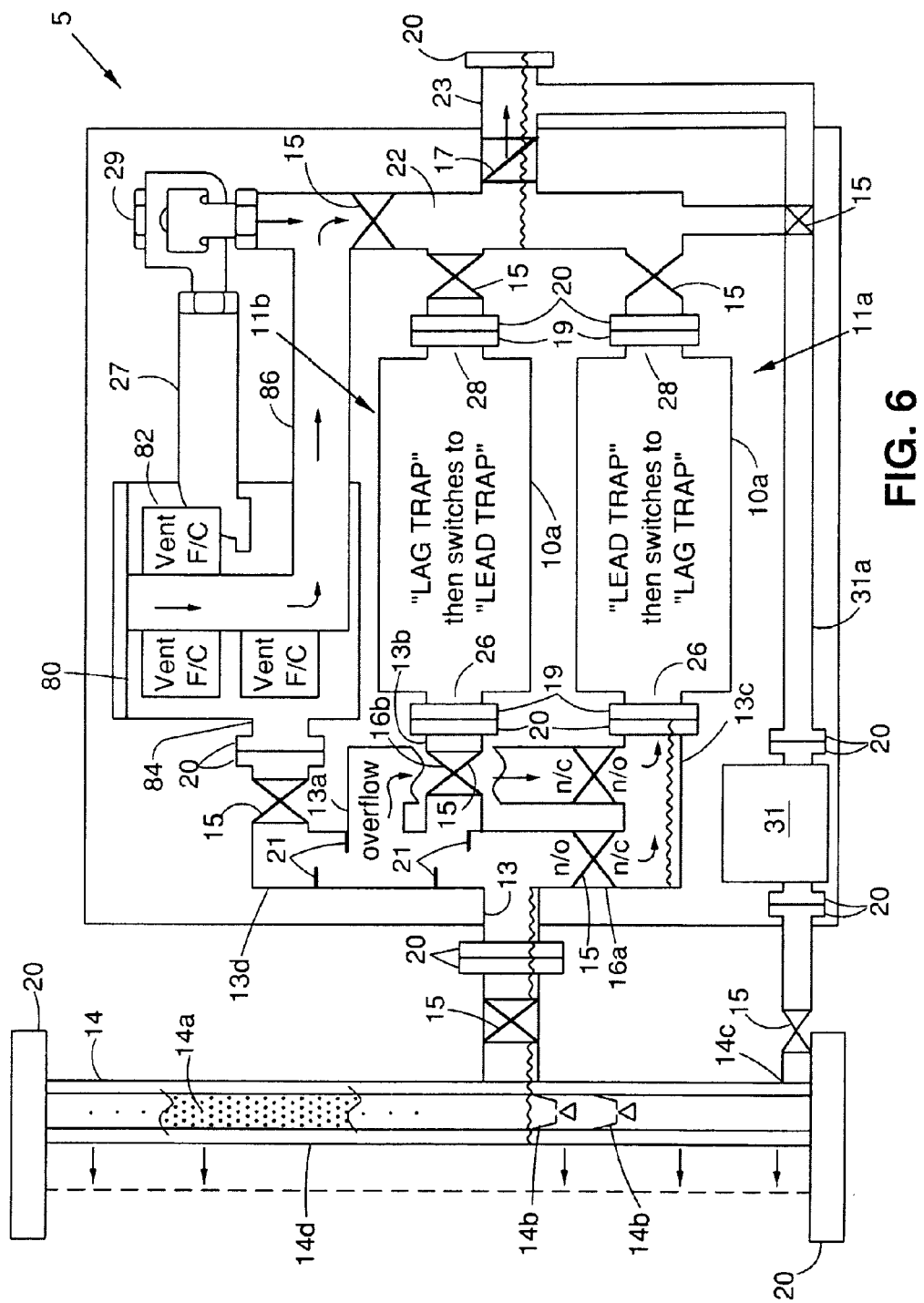
FIG. 6 is a schematic drawing of another embodiment of a steam trap system.
Figure 7:
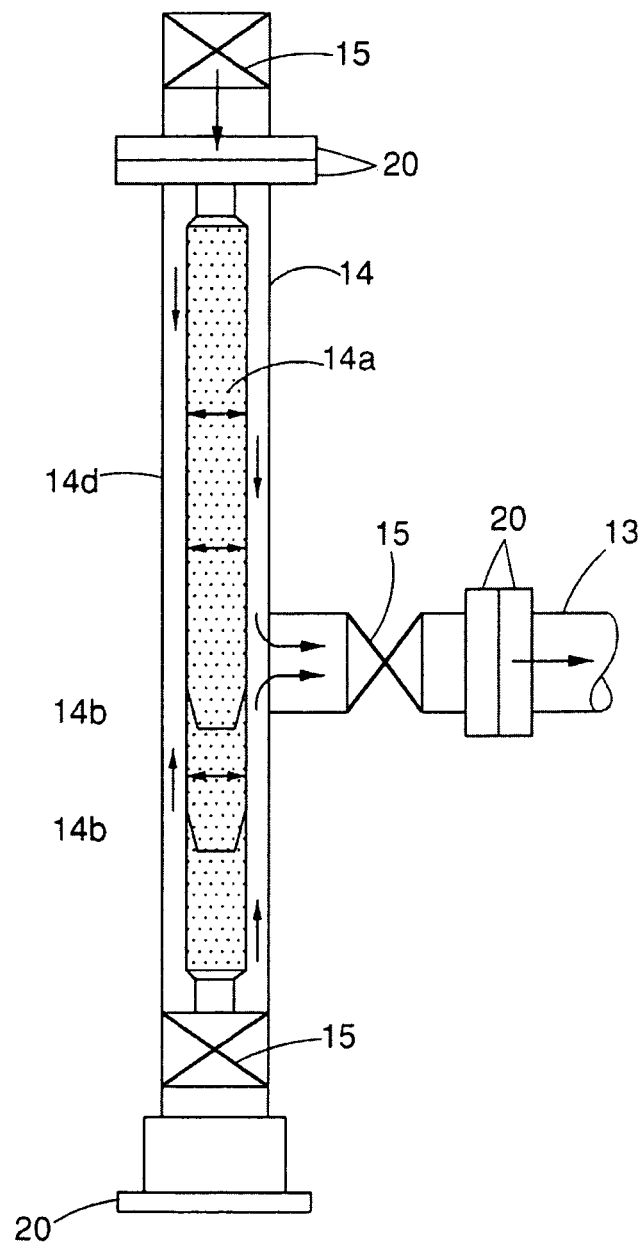
FIG. 7 depicts an embodiment of a strainer.

Referring to FIG. 6, steam trap system 5 differs from steam trap system 3a in that vertical line 14 can include a strainer 14a (FIG. 7) such as a generally tubular mesh screen within a strainer segment 14d for straining contaminants, debris, or particles. Steam and condensate can enter interior of the strainer 14a and flow radially outwardly through the mesh screen, to enter horizontal line 13. Sediment or debris collectors 14b, such as screen cones or cups, for example having 0.045 inch mesh, can be positioned within strainer 14a below line 13 for collecting contaminants, debris, particles or sediment. Such a straining arrangement in line 14 can be employed instead of a Y-strainer, and can be in a location that can receive more attention and maintenance. A port 14c can be located in strainer segment 14d for collecting sediment for disposal or spectral analysis. A bypass line 31a can be connected to the bottom of strainer segment 14d at port 14c, and lines 22 and/or 23 for removing water from the bottom of strainer segment 14d and line 14. Line 31 a can include a filtration module 31 for collecting sediment for disposal or spectral analysis. The filtration module 31 can be mounted with flanges 20. Line 31 a can include upstream and downstream valves 15 for isolation from lines 14, 22 and 23. Referring to FIG. 7, the strainer 14a can be isolated by valves 15 on upstream and downstream sides and can be isolated from line 13 by a valve 15. Mounting flanges 20 can be on the strainer segment 14d to allow easy removal and replacement of strainer segment 14d, and strainer 14a. Loop 13a can include water hammer protection structures or baffles 21 extending from alternating sides on the upstream side of loop 13a for providing water hammer protection. Air purge device 80 can include an orifice or vent member 82 for venting air. If the orifice member 82 fails, a valved orifice member or vent 29 which can fail open can vent the air. Vent 29 can be in communication with air purge device 80 via line 27 and can also be in communication with outlet 86 and line 22. A valve such as a check valve 17 can be positioned between line 22 and drain line 23.

Figure 8:
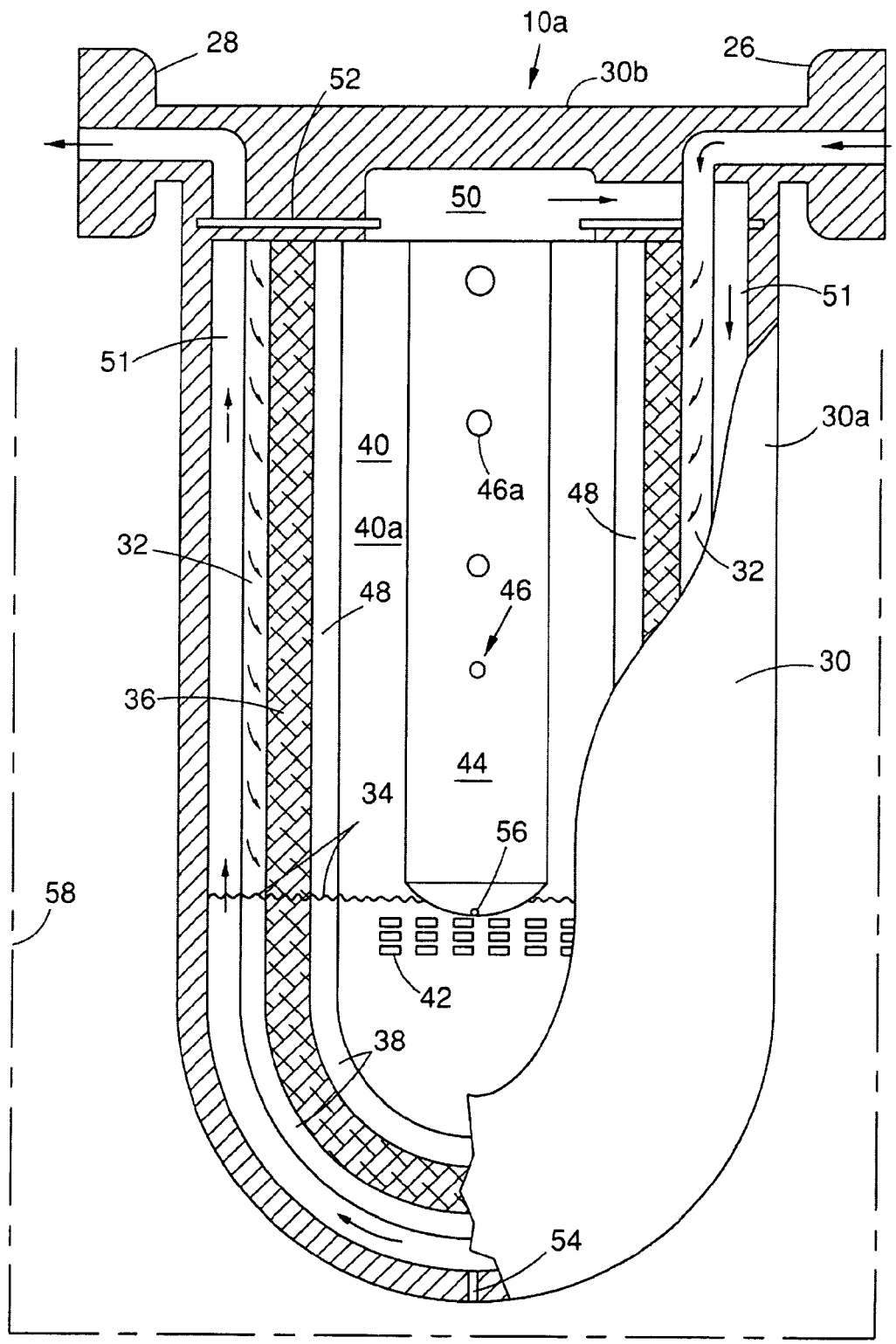
FIG. 8 is a schematic drawing of an embodiment of a steam trap with a portion of the outer housing removed.

Referring to FIGS. 8 through 10, in one embodiment, the steam trap 10a can have an outer housing 30 with an inlet 26 and an outlet 28. The housing 30 can have a first or lower portion 30a and a second or upper portion 30b which can be sealed together by bolts or other suitable methods. The lower portion 30a can have a generally cylindrical shape with a rounded bottom and can be removable from the upper portion 30b. A bimetal washer 52 can expand into grooves within the lower portion 30a when heated and prevent the removal of the lower portion 30a when hot, as a safety measure. Steam and any condensate entering the inlet 26 can enter a first annular cavity 32 which surrounds a filter 36. The filter 36 can be generally annular, and can have a hemispherical lower portion. The annular cavity 32 can also extend around the bottom of the filter 36 in a hemispherical manner. Water 34 collecting or condensing within annular cavity 32 can collect in a water collector 38 generally located at the bottom region of the housing 30. The steam and water 34 can pass through the filter 36 radially inwardly and into a second annular cavity 48 within the filter 36. Filter 36 can filter out particles, debris and contaminants that can clog or otherwise affect the operation of the steam trap 10a. A tube 40 can be concentrically positioned within filter 36. The water 34 can rise within the water collector 38 and annular cavity 48. The rising water 34 can rise around tube 40 until reaching passages, openings or holes 42 on a lower portion of tube 40 to enter tube 40. An orifice arrangement or member 44 can be concentrically positioned within the tube 40 forming a third annular cavity 40a. The orifice member 44 can have multiple or a series 46 of at least two or more spaced valved orifices 46a which can extend and be spaced vertically or upwardly on the orifice member 44. The valved orifices 46a can be normally closed, but can open when in contact with water 34 rising in the water collector 38, entering tube 40 and rising upwardly relative to orifice member 44 within cavity 40a. When the water level 34 is below the series of valved orifices 46a, the valved orifices 46a are closed, and neither water 34 nor steam can escape the steam trap 10a. As a result, the steam line 12 does not experience any unwanted steam loss and can operate efficiently. As the water level 34 reaches the first valved orifice 46a, the valved orifice 46a opens and allows the water 34 to enter the interior of the orifice member 44. The pressure of the system can force the water 34 upwardly out of orifice member 44 through a check valve 50 and out a passage 51 which can be located between annular cavity 32 and the lower portion 30a and connected to the outlet 28. The passage 51 can extend below the filter 36 and can be annular in shape. Water 34 passing through the passage 51 can be heated by steam entering annular cavity 32 so that when the water 34 is recirculated to the boiler, less energy is required to heat it back in to steam. Conversely, steam entering cavity 32 can be cooled by the water 34 in passage 51 to reduce flash steam when passing through valved orifices 46a. As a result, the passage 51 and cavity 32 can operate as a heat exchanger. In some embodiments, heat exchange cooling fans or structures can provide cooling. Also, in some embodiments, the passage 51 can extend between check valve 50 and outlet 28 in a more direct line, for example through upper portion 30b.

As water 34 rises above one or multiple valved orifices 46a, all or selected valved orifices 46a that are contacted or covered with water 34 can open, thereby draining water 34. If multiple valved orifices 46a are opened, water simultaneously drains 34 through multiple orifices 46a in parallel. As a result, increases in water level 34 can result in an increase of water removal ability through an increased number of orifices. The valved orifices 46a can be of the same size, or can increase in orifice size moving upwardly on the orifice member 44. Increasing the orifice size moving upwardly can further prevent the buildup of water 34 which can then enter steam line 12, and can increase water removal speed. The uppermost valved orifice 46a can be sized so large that water 34 will always be sufficiently drained if the water level gets that high, as a safety factor. The size of the valved orifices 46a can be oversized to have a safety feature.

Referring to FIGS. 9 and 10, the valved orifices 46a can be positioned radially around the orifice member 44. In some embodiments, the valved orifices 46a can be arranged in an ascending spiral or helix configuration. Having a series 46 of the valved orifices 46a spaced apart moving upwardly or vertically along the orifice member 44 can minimize the amount of times that each valved orifice 46a opens and closes, thereby limiting the amount of wear of each valved orifice 46a, and increasing the life of the steam trap 10a. For example, if only a single valved orifice 46a were used, it might open and close hundreds of times a day. Each valved orifice 46a can be independently and automatically operated by a thermostatic bimetal arrangement or member 46d with a valve member 46b which opens and closes an orifice 46c based upon the heat directed on the valved orifice 46a. The thermostatic member 46d can comprise a thermostatic actuated internally balanced bellow type member. The valved orifice 46a can be set to be closed when subjected to the heat of steam so that steam does not unnecessarily escape, but set to open at a temperature at which water forms, for example, the temperature of saturated steam. As a result, only the valved orifices 46a contacted by water can open to remove the water 34. In other embodiments, the valved orifices 46a can have other mechanisms for opening and closing, for example, sensors and solenoids, floats, etc. In some embodiments, the series 46 of valved orifices 46a do not have to be in a spiral configuration, but can have a series of spaced rings of valved orifices 46a that are at the same level, or in annular arrangements moving up the orifice member 44. In other embodiments, the valved orifices 46a do not have to be radially positioned, but can have valved orifices 46a only on one side of the orifice member 44, or on two sides.

The valved orifices 46a can be set to open at particular temperatures at different locations. For example, the valved orifice 46a at the top can be set at the saturation temperature. The valved orifices 46a descending down the orifice member 44 can be set to open at descending temperatures, for example by about 0 to −2° F. to −5° F., depending upon the situation. For example, a group of vertically spaced valved orifices 46a on orifice member 44 can be set at descending or decreasing temperatures moving down the orifice member 44 as follows, 250° F., 245° F., 240° F., 235° F. and 230° F. Conversely, moving upwardly on the orifice member 44, the valved orifices 46a can also be considered set at ascending or increasing temperatures, such as with the above temperature examples. The valved orifices 46a can be set at other selected temperatures for desired operation, and do not have to be set at different temperatures. In addition, one or some of the valved orifices 46a can be set for exhausting gases instead of water 34.

The orifice member 44 can have a valved drain 56 at the bottom that is set to open at a temperature that is near the freezing point of water (for example 40° F.), to drain any water 34 before it freezes. The lower portion 30a of the housing 30 can also have a valved drain 54 which can be a manual drain or set to open at a temperature near the freezing point of water. A guard or shield 58 can extend around the steam trap 10a to prevent accidental contact and burning of people, such as maintenance workers. The lower portion 30a, filter 36, tube 40 and orifice member 44 can be round for strength as well as to reduce stress caused by heating and cooling, and can be concentrically positioned relative to each other. Although these components can have hemispherical bottoms, alternatively, the bottoms can be flat, and can extend the full height or length of the lower portion 30a. In some embodiments, the filter 36 can be a separate component than the orifice member 44 or steam trap 10a and can be positioned within leg 11 a or 11 b upstream from the orifice member 44. The steam trap 10a or some of its components can be disposable.

Although FIGS. 1-6 show the use of steam traps 10a, alternatively, any commercially available steam trap can be employed in legs 11a and 11b, whereby when one leg 11a or 11b fails, that leg can be shut off for maintenance, and the other leg can be operated. Therefore, the dual leg configuration can use conventional steam traps, and still allow the steam line 12 to operate more efficiently than just a single steam trap.

Referring to FIGS. 11 and 12, the valved orifices 46a can include valve members 62 which can be connected to the orifice member 44 by piping, or fittings, for example, an elbow 60 or a straight nipple 64. Consequently, the position of the valve member 62 can be selected by the piping or fitting for selecting the entry position of the water. The valve members 62 can be generally cylindrical thermostatic valve members, such as commercially available Tunstall capsules with stainless steel bodies, Barnes and Jones Super Trap 6000 with stainless steel construction and kevlar gaskets, or other suitable commercially available thermostatic valves. In some embodiments, each valve member 62 can include a strainer filter screen 62a, for example, cylindrically surrounding the periphery of the valve member 62, to prevent or reduce dirt or debris from entering the orifice 46c.

Figure 13:
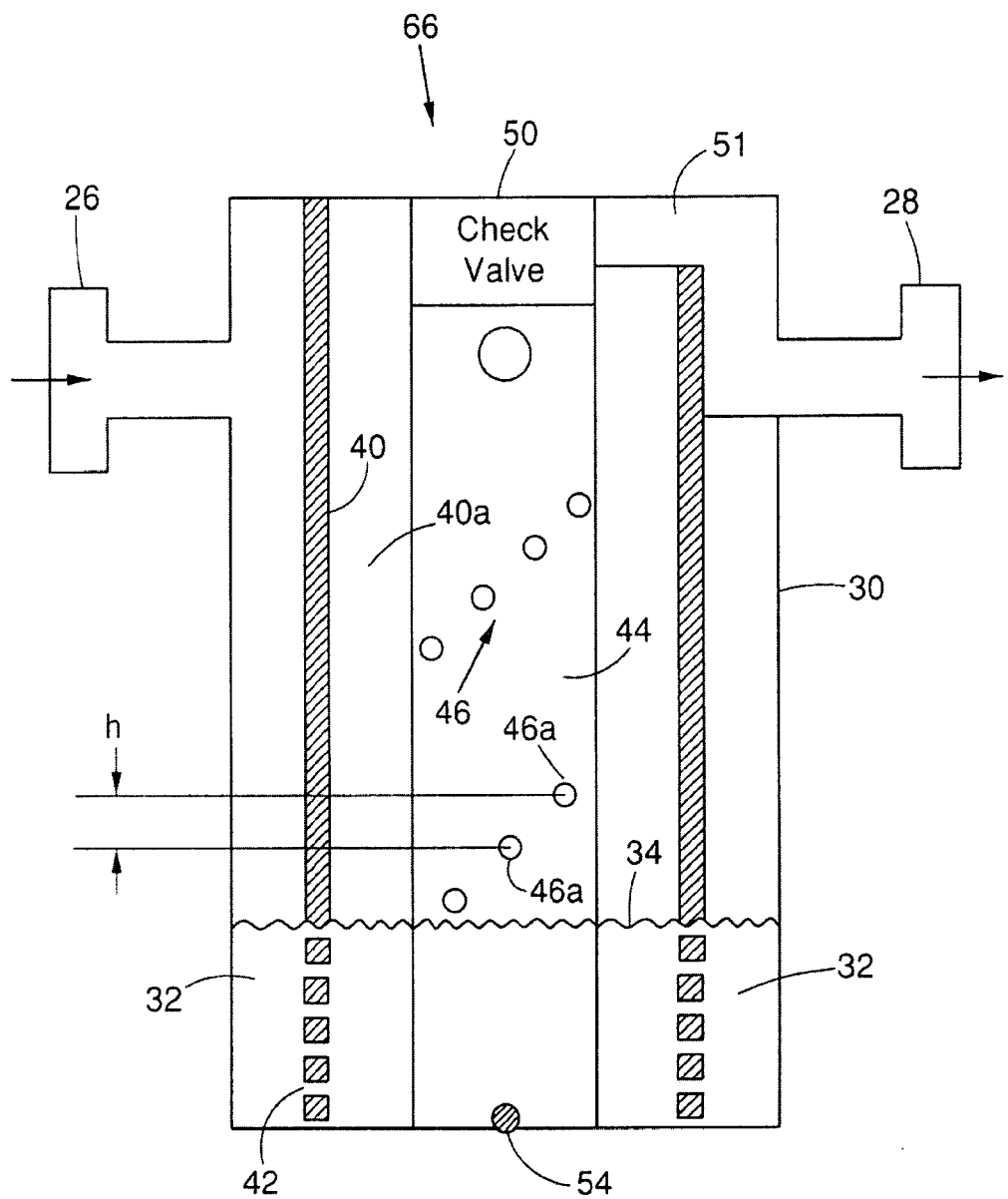
FIG. 13 is a schematic drawing of an embodiment of a steam trap without a filter.
Figure 14:
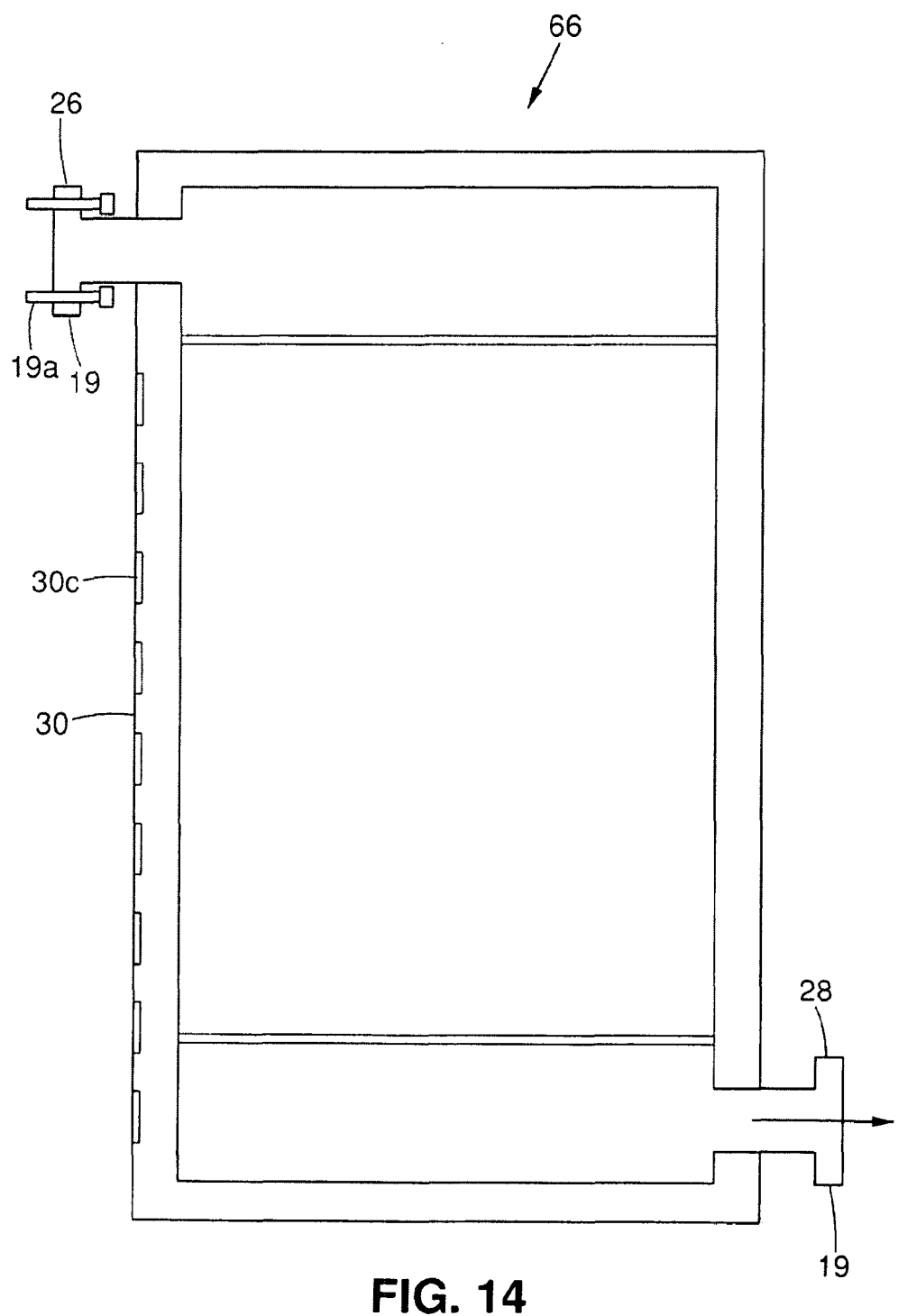
FIG. 14 is a schematic drawing depicting an alternate outlet location.

Referring to FIG. 13, steam trap 66 is an embodiment of a steam trap that can be substituted for steam trap 10a. Steam trap 66 does not require a filter 36 and can have a flat bottom from which tube 40 can extend. The height "h" between valved orifices 46a can be chosen to suit the situation at hand. Referring to FIG. 14, the outlet 28 can be positioned at the bottom and the housing 30 can have cooling fins 30c for radiant heat transfer which can cool incoming flow and reduce flash steam. The inlet 26 and outlet 28 can have flanges 19 that can be mounted with bolts or screws 19a.

Figure 15:
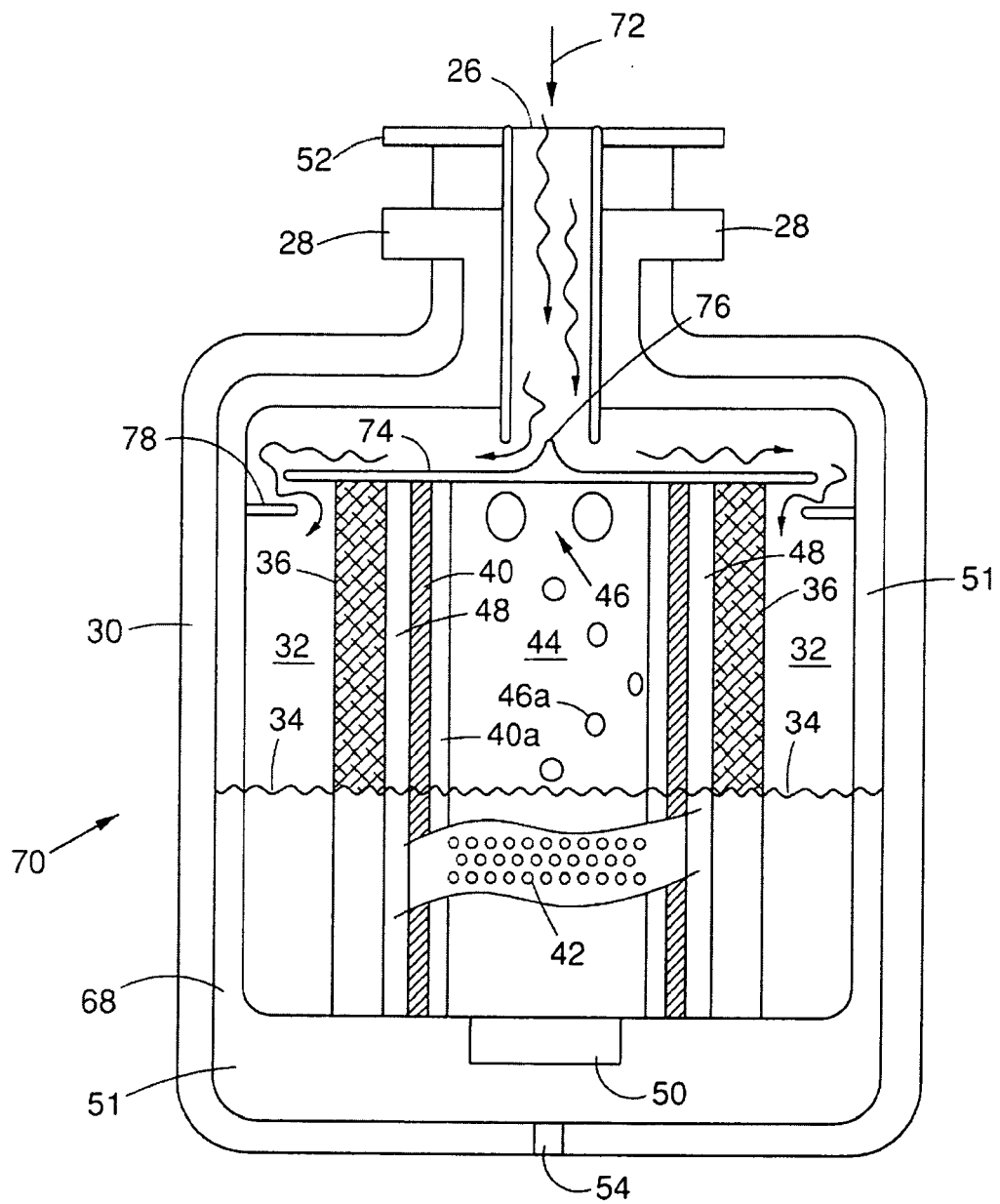
FIG. 15 is a schematic drawing of another embodiment of a steam trap.

Referring to FIG. 15, steam trap 70 is another embodiment of a steam trap which differs from steam trap 10a in that it can include a water hammer protection structure 74 for protecting the internal components. The water hammer protection structure 74 can block incoming steam and condensate 72, entering a central inlet 26 and can have an angled or curved shield 76 for directing the steam and condensate 72 laterally. A baffle 78, which can be annular in shape, can further be included. The check valve 50 can be positioned at the bottom of the orifice member 44 through which condensate 68 or water can flow through passage 51 and outlet 28.

Figure 16:
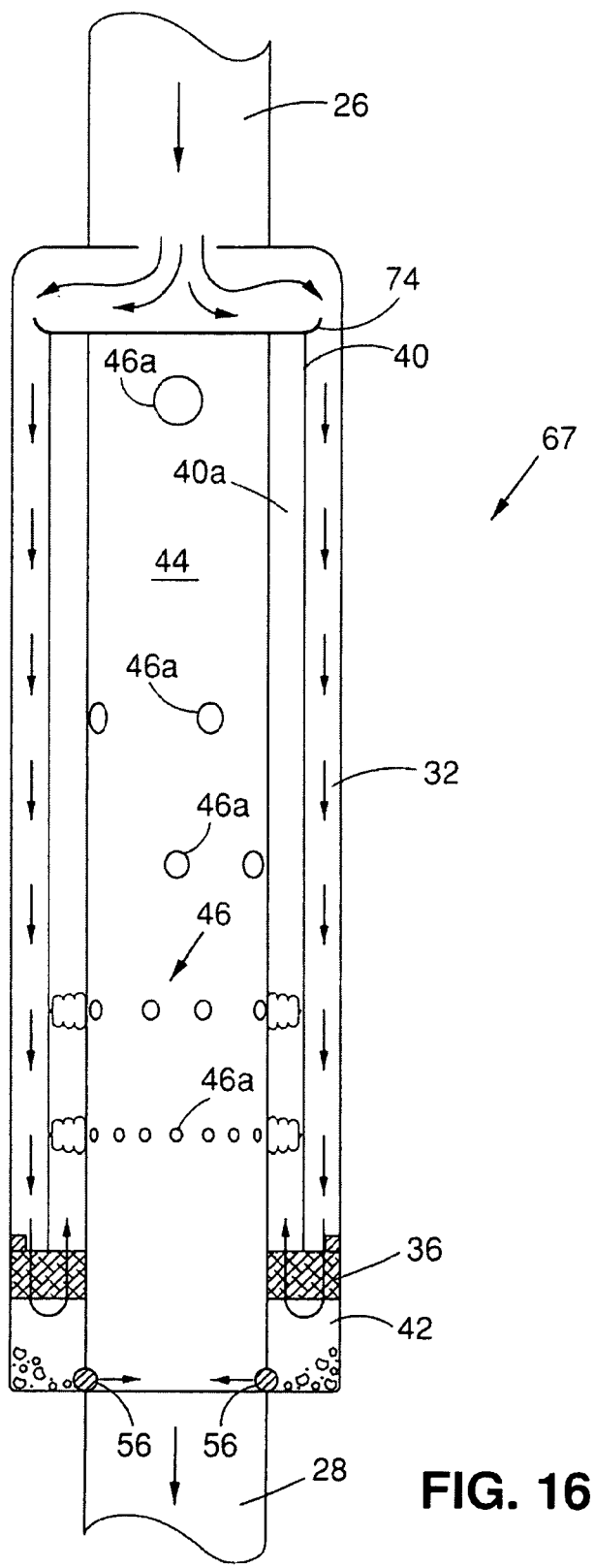
FIG. 16 is a schematic drawing of yet another embodiment of a steam trap.

Referring to FIG. 16, steam trap 67 can be substituted for steam trap 10a and differs from steam trap 70 in that filter 36 can have an annular disk shape and be positioned around orifice member 44. Steam and condensate can enter inlet 26 at the top of steam trap 62. Tube 40 can extend downwardly from the water hammer protection structure 74 to the filter 36, forming annular passages or cavities 32 and 40a. Steam or water can pass from cavity 32 through filter 36, into passage 42, and then back through filter 36 into cavity 40a. Water entering orifice member 44 can exit through an inline outlet 28 at the bottom of orifice member 44. Valved drains 56 can be positioned on radial sides of orifice member 44 within passage 42 for draining water into outlet 28 before the freezing point.

Figure 17:
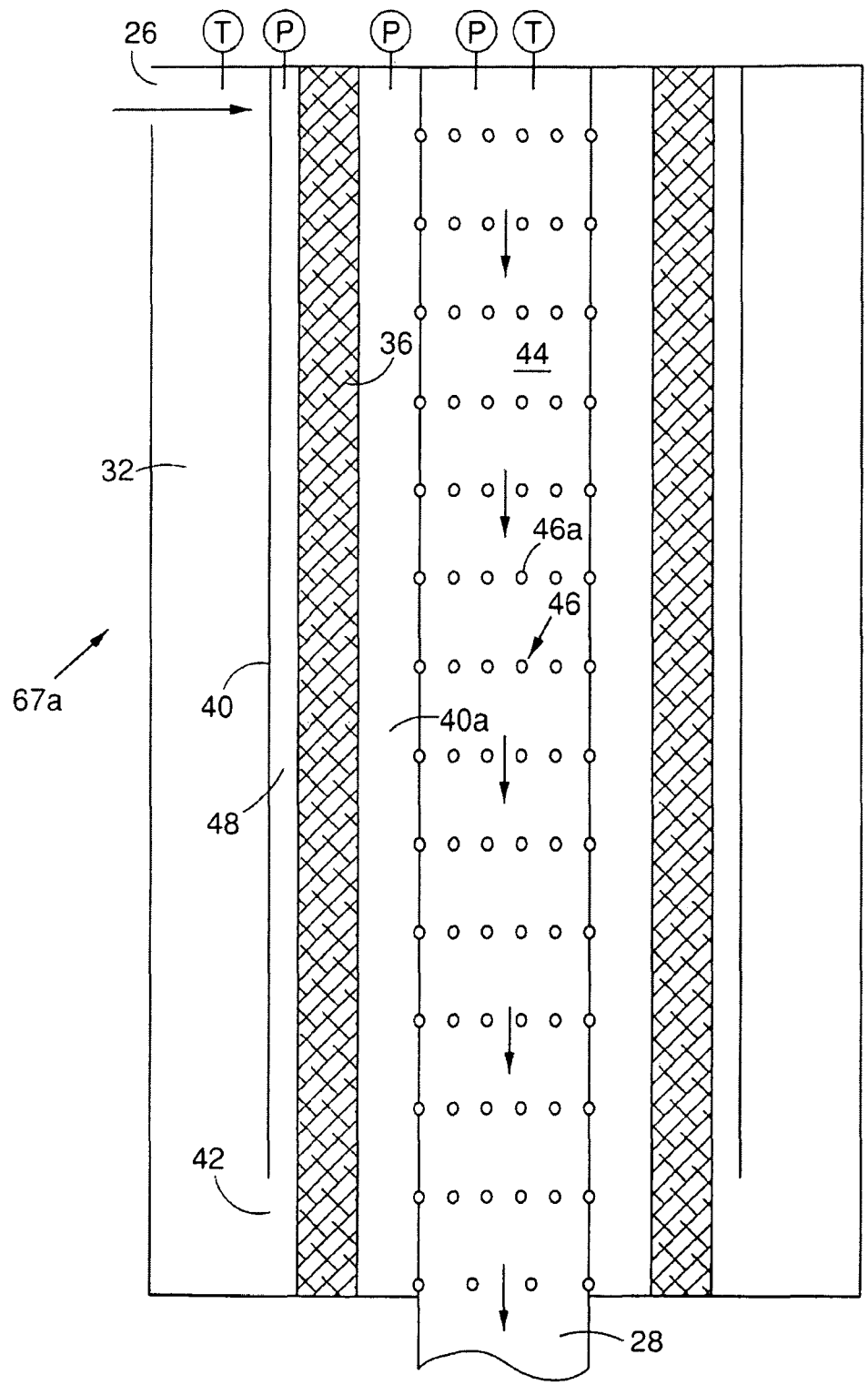
FIG. 17 is a schematic drawing of still another embodiment of a steam trap.

Referring to FIG. 17, steam trap 67a can be substituted for steam trap 10a and differs from steam trap 67 in that an annular filter 36 can be included between tube 40 and orifice member 44. Tube 40 can have a single opening 42 at the bottom. The series 46 of valved orifices 46a can be arranged in annular rings along the orifice member 44. As a result, each annular ring can have a plurality of individual automatically operated valved orifices 46a at a common height or level. The valved orifices 46a can be of the same size. The outlet 28 can be located at the bottom of the orifice member in a similar manner as in steam trap 67.

Figure 18:
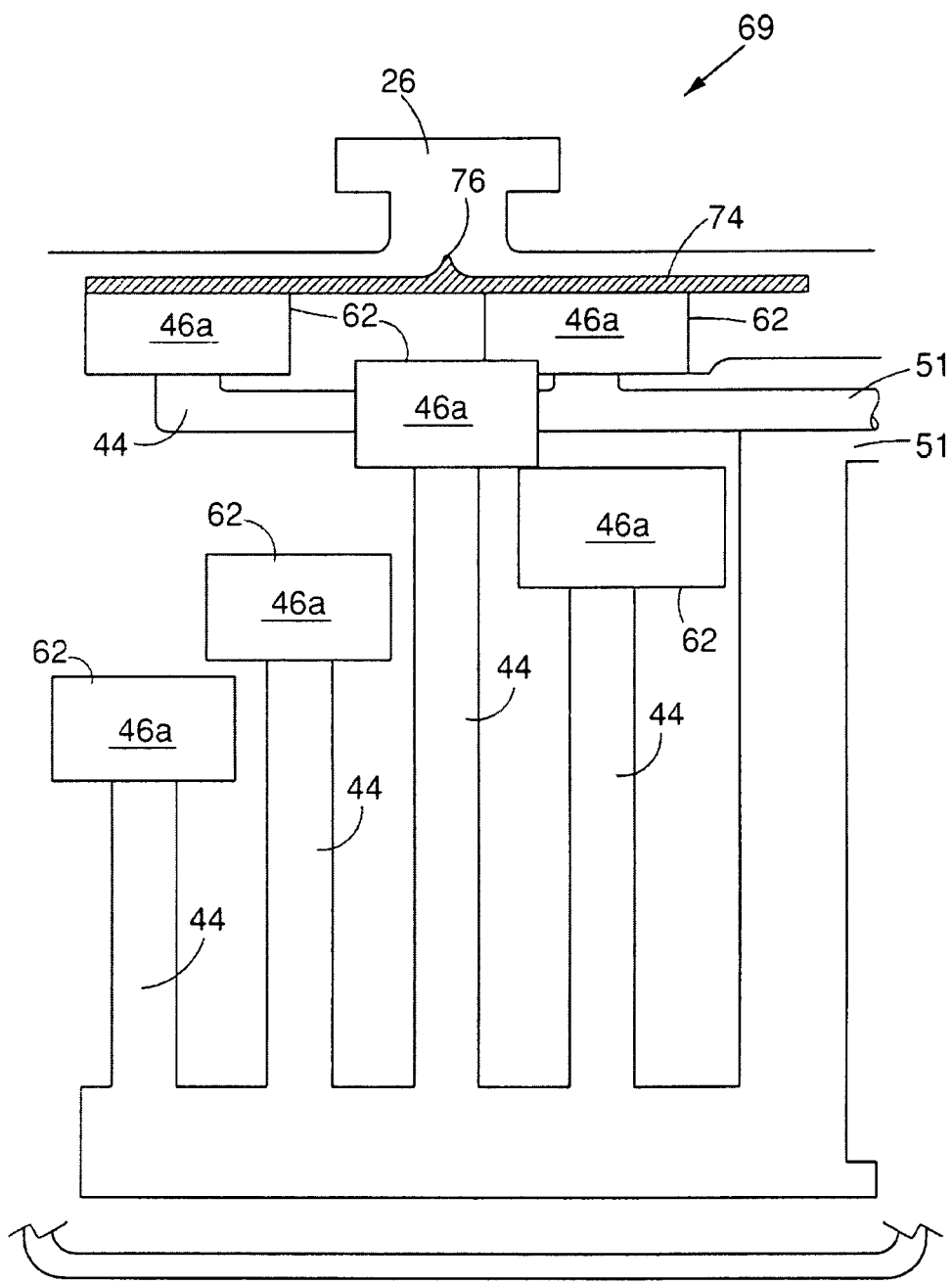
FIG. 18 is a schematic drawing of a portion of another embodiment of a steam trap.

Referring to FIG. 18, steam trap 69 can be substituted for steam trap 10a and differs from steam trap 70 in that steam trap 69 can have multiple orifice members 44 each having a single valved orifice 46a or valve members 62, positioned at various, different or selected heights. A filter 36 and tube 40 can be included if desired.

Figure 19:
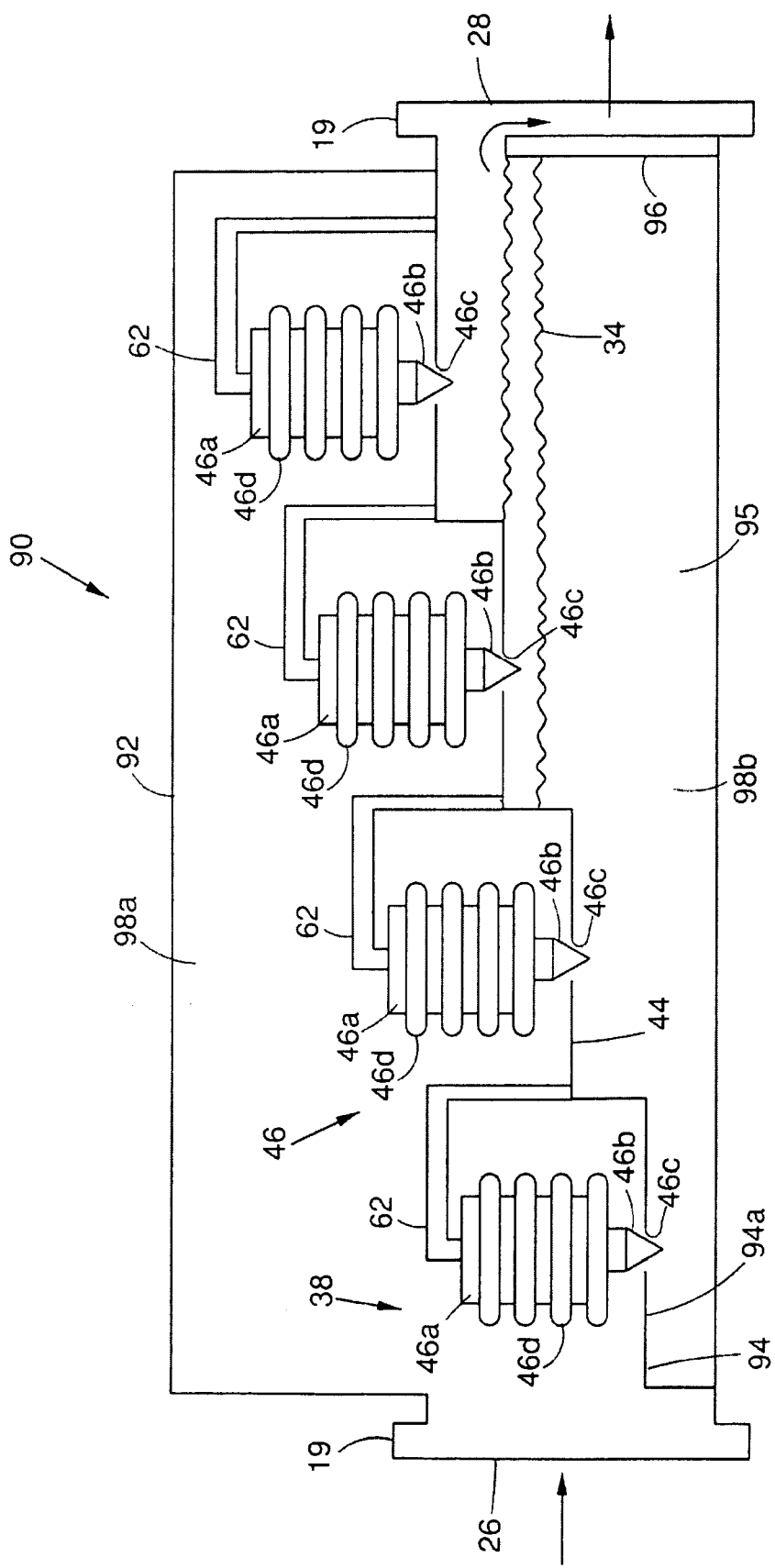
FIGS. 19 and 20 are schematic drawings of another embodiment of a steam trap.
Figure 20:
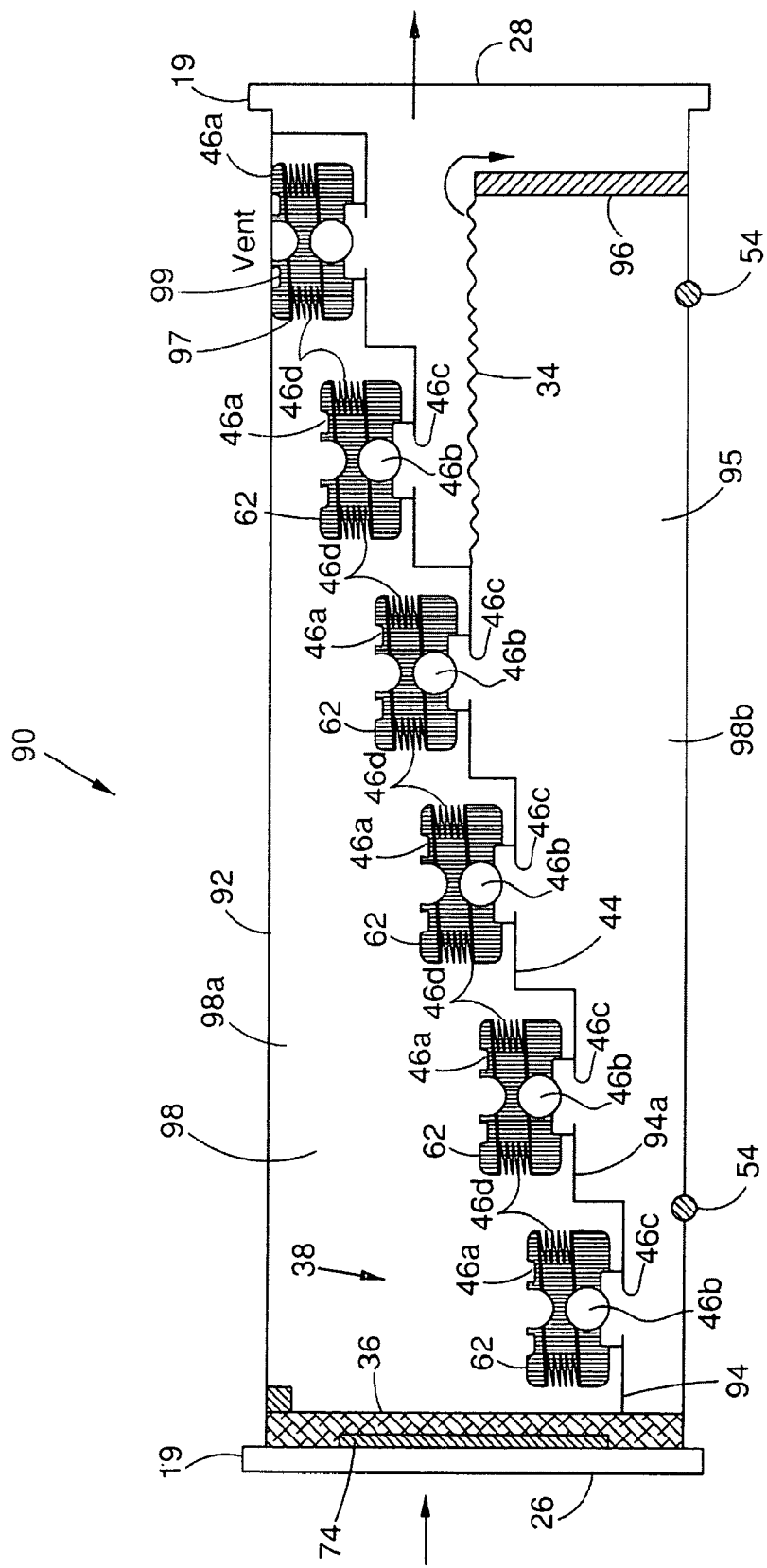

Referring to FIGS. 19 and 20, steam trap 90 is another embodiment of a steam trap which can be substituted for steam trap 10a and can have a housing 92 with a laterally positioned inlet 26 and outlet 28 with flanges 19. A water hammer protection structure 74 such as a plate, and a filter 36 can be positioned at inlet 26 (FIG. 20). The interior 98 of housing 92 can have a longitudinal or laterally extending partition, divider or barrier 94, forming an orifice arrangement or member 44 that extends from the inlet 26 to the outlet 28 and increases in vertical height moving toward the outlet 28, rising relative to the water collector 38. The barrier 94 can have a series of steps 94a and divide the interior 98 into two portions 98a and 98b. The barrier 94 can have a series 46 of valved orifices 46a or valve members 62 positioned at different longitudinal or lateral positions next to each other at increasing heights, for example, on the steps 94a. Although one valved orifice 46a is shown on each step 94a, it is understood that more than one valved orifice 46a can be on each step 94a and the number of steps 94a can vary. Water 34 accumulating in the housing 92 within water collector 38 in portion 98a can cause the valved orifices 46a in contact with the water 34 to open, allowing the water 34 to pass into portion 98b. A dam 96 within portion 98b causes the water 34 to accumulate in a water reservoir 95 which can induce heat transfer and can prevent or reduce flash steam. Discharge of the valved orifices 46a into this reservoir 95 of water 34 can also reduce or prevent flash steam. Water 34 can spill over dam 96 and exit through outlet 28. Each valved orifice 46a in contact with water 34 opens to drain water 34, so that the higher the water level, the faster the water 34 is drained. The valved orifices 46a at each step 94a can be set to open at different temperatures, for example in FIG. 20, the lowest valved orifice 46a to the highest can be set as follows, first valved orifice 46a: −10° F. below saturation temperature set point, second valved orifice 46a: −5° F. below saturation temperature set point, third through fifth valved orifices 46a: −2° F. to −3° F. below saturation set point, sixth valved orifice 46a: at saturation temperature. It is understood that depending on the situation at hand, different temperatures can be selected. Valved drains 54 on the bottom of housing 92 in portion 98b can be set to drain water 34 close to the freezing point. The valved orifices 46a can fail closed. The top valved orifice 97 can have a vent 99 to atmosphere. Alternatively, the top valved orifice 97 can be configured to fail open or closed.

The diameter of the orifices 46a can be 5/16 inches in diameter. The inlet 26 and outlet 28 can be positioned in any other suitable orientation, position or direction. The height of each step 94a can be varied depending upon the situation.

Embodiments of stream traps in the present invention can minimize vented steam, and optimize condensate recovery. In some embodiments, as previously described, the steam trap can sub cool pressurized water or condensate prior to discharge by surrounding with a reservoir of atmospheric water or condensate. The potential for flash steam can be reduced or avoided by the combination of removing sensible heat from the pressurized water or condensate and by discharging the pressurized water or condensate directly into the atmospheric condensate reservoir. Preventing flash steam can reduce wear by corrosion or erosion on the orifices 46c and valve members 46b. The reservoir can absorb available latent heat that occurs with a change in phase as the pressurized condensate passes from a higher pressure into the discharge side of the steam trap. Transferring the sensible heat to the condensate prior to return to the boiler can conserve a significant amount of energy. One or more of the valved orifices 46a in the upper portion of the steam trap can be employed for purging of air at start up. In addition, one or more valved orifices 46a can be designed to fail open and can be located where operation is the least frequent. The number of air vents can exceed the inlet area to allow full capacity purging even if one valved orifice 46a fails closed. Smaller diameter valved orifices 46a can be positioned at the bottom of the orifice member 44 and represent only a fraction of the maximum rated capacity of the steam trap. With appropriate spacing, the smaller diameter valved orifices 46a can stay in the open position longer, modulating condensate discharge as opposed to a cyclic action, resulting in less openings and closings per valved orifice 46a.

Depending upon the situation at hand, the valved orifices 46a can be configured to all fail open, all fail closed, or a combination of both. For example, in some embodiments, the top valved orifice 46a can have a large diameter orifice 46c that fails closed and is calibrated to open at saturated steam temperature. The top valved orifice 46a can remove air and noncondensable gases, as well as provide a safety factor and avoid water logging. The second from the top valved orifice 46a can have a large diameter orifice 46c that fails open and is calibrated to open at a selected amount of degrees below saturated steam temperature, for removing condensate and can discharge noncondensable gases during normal operation and at start up. The remaining lower valved orifices 46a can have smaller orifices 46c sized for normal water flow that fail closed and are calibrated to open at a selected amount of degrees below saturated steam temperature, for removing condensate and to discharge noncondensable gases including air at start up.

At start-up, air which unless displaced, can reduce heat transfer and increase the warm-up time. It is preferable to purge air as quickly as possible before it has a chance to mix with the incoming steam. Air in the system can be discharged through the steam traps which can be fully open at start-up. The steam traps in the steam trap systems can purge or vent air when the valved orifices 46a are configured to be normally open when exposed to air, and closed when exposed to steam. However, the flow path through the steam traps 10a is narrow, and therefore, the purging of air can be time consuming, for example hours.

Figure 21:
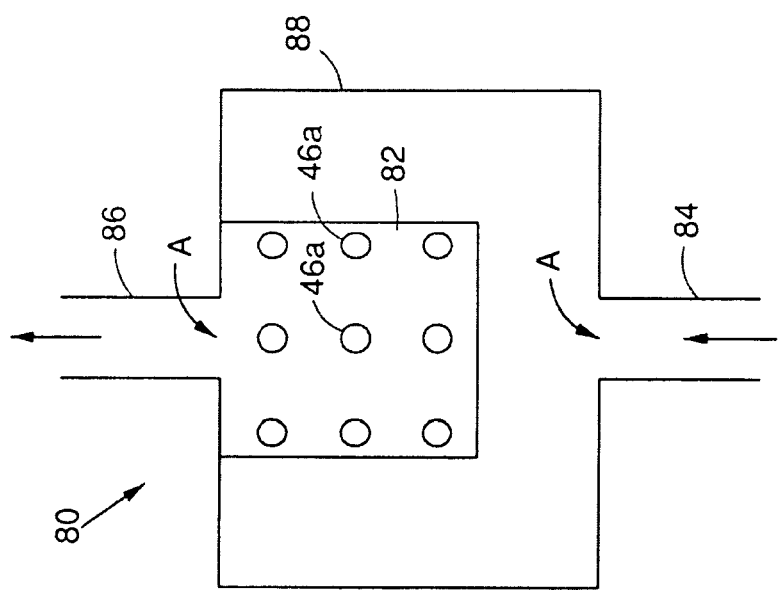
FIG. 21 is a schematic drawing of a power air purge device.

Referring to FIG. 21, the high volume power air purge device 80 can be positioned upstream of the steam traps where the piping has a large diameter so that the air can be moved at large volumes and purged or vented quickly. The power air purge device 80 can include a housing 88 having an inlet 84 and an outlet 86. A vent or orifice arrangement or member 82 can be positioned within the housing 88, upstream or in front of the outlet 86. The orifice member 82 can have a series or plurality of, or multiple valved orifices 46a in parallel, which are normally open in the presence of air, and close when exposed to steam. The valved orifices 46a can be operated individually and automatically to open and close. The collective size or area of the orifices of the series of valved orifices 46a can be equal to or greater than the area A of the inlet 84. The outlet 86 can have the same size or area A as the inlet 84. As a result, air entering the power air purge device 80 can be purged as quickly as it enters the inlet 84 by entering the orifice member 82 through the multiple valved orifices 46a and exhausted through outlet 86.

Having the collective orifice area of the individually operated valved orifices 46a larger than area A by at least one or more valved orifices 46a can provide a safety factor in the event that some valved orifices 46a fail. Air can be purged more quickly by the power air purge device 80 than by the steam traps, for example in minutes, since the purging is accomplished at a large diameter pipe rather than the narrow passages of a steam trap. Some purging can also be performed by the steam trap. Once the air is purged and steam contacts the valved orifices 46a in the power air purge device 80, the valved orifices 46a close to prevent steam loss. The valved orifices 46a in the steam traps will also close once exposed to steam. One or more water hammer protection structures 18 can be included. In some embodiments, the combined orifice area of the valved orifices 46a can be smaller than the area A of the inlet 84. Although the valved orifices 46a can be thermostatic and set to open and close at particular temperatures, other suitable valved orifices can be employed, for example, actuated by sensors, solenoids, other actuators etc. The valved orifices 46a in the power air purge device 80 can be configured to all fail closed to prevent steam loss. Although the collective size or area of the orifices of the valved orifices 46a is typically equal or greater than the area A of the inlet 84, alternatively, a collective size that is smaller can still provide faster purging than by just a steam trap.

Figure 22:
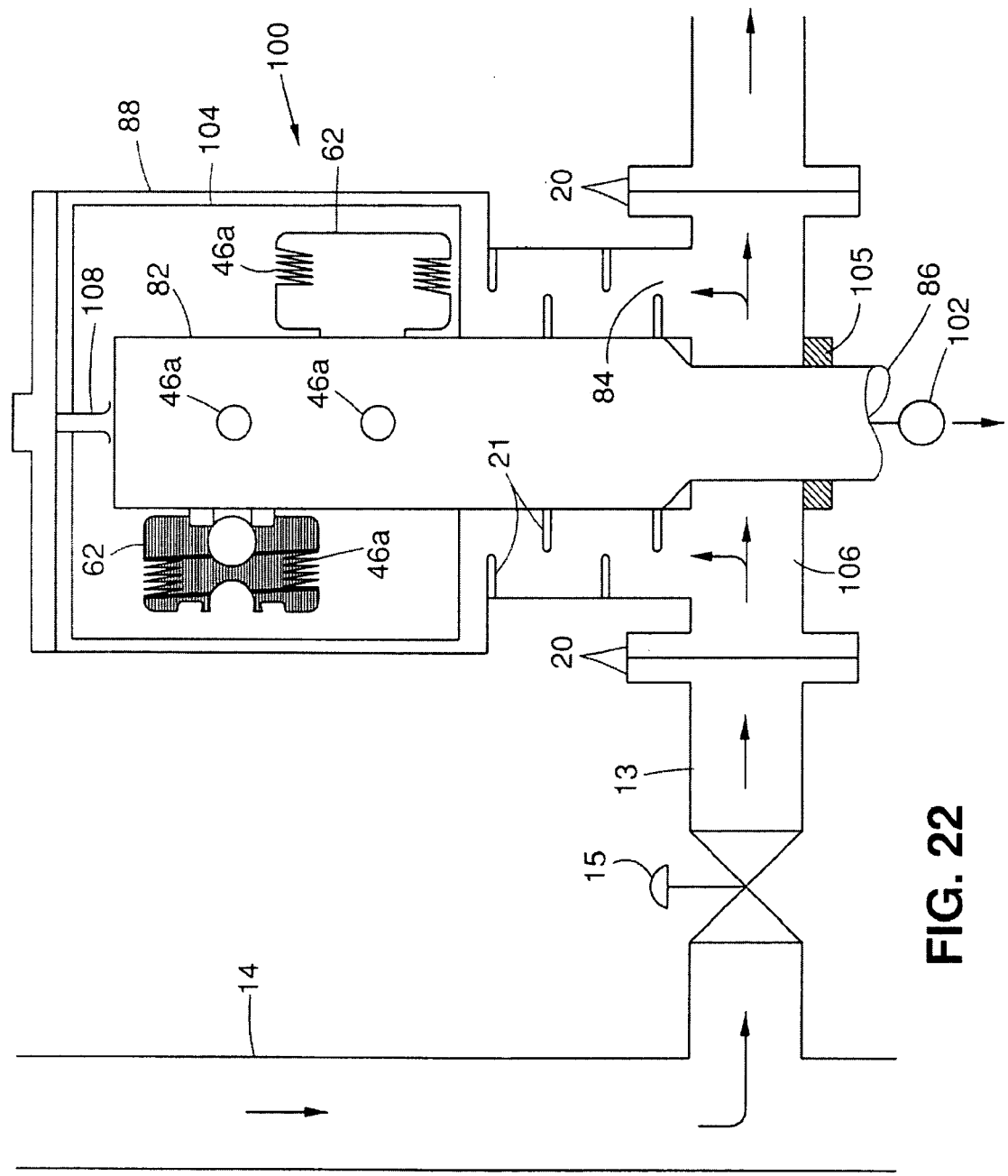
FIG. 22 is a schematic drawing of another air purge device.

Referring to FIG. 22, high volume power air purge device 100 is another embodiment of an air purge device. Air purge device 100 can have mounting flanges 20 allowing mounting to mating flanges 20, for example, in line 13. A horizontal passage 106 can extend between flanges 20. Inlet 84 can extend upwardly from passage 106 to housing 88 and can include baffles 21 positioned in an alternating arrangement to provide water hammer protection. Inlet 84 can be generally annular in shape. Air can enter housing 88 from inlet 84. The housing 88 can include a filter or mesh screen 104, for example, ⅛ inch screen and generally cylindrical in shape, for filtering out contaminants or particles. The orifice member 82 can be positioned cylindrically within the mesh screen 104, and the valved orifices 46a on the orifice member 82 can be surrounded by the mesh screen 104. The orifice member 82 can have a selected number and arrangement of valved orifices 46a, for example, five valved orifices 46a positioned 72° apart. A nozzle 108 above orifice member 82 can provide cooler air to increase valve opening momentarily. The outlet 86 can extend downwardly from the orifice member 82 through the center of inlet 84 and passage 106, for venting air and non-condensable gases to atmosphere or a drain. Outlet 86 can be sealed relative to passage 106, by a bimetal seal 105. A flow meter 102 can measure the amount or flow rate of the vented gases. Air purge device 100 can be designed and positioned to pick up minimal convectional heat from nearby components.

Figure 23:
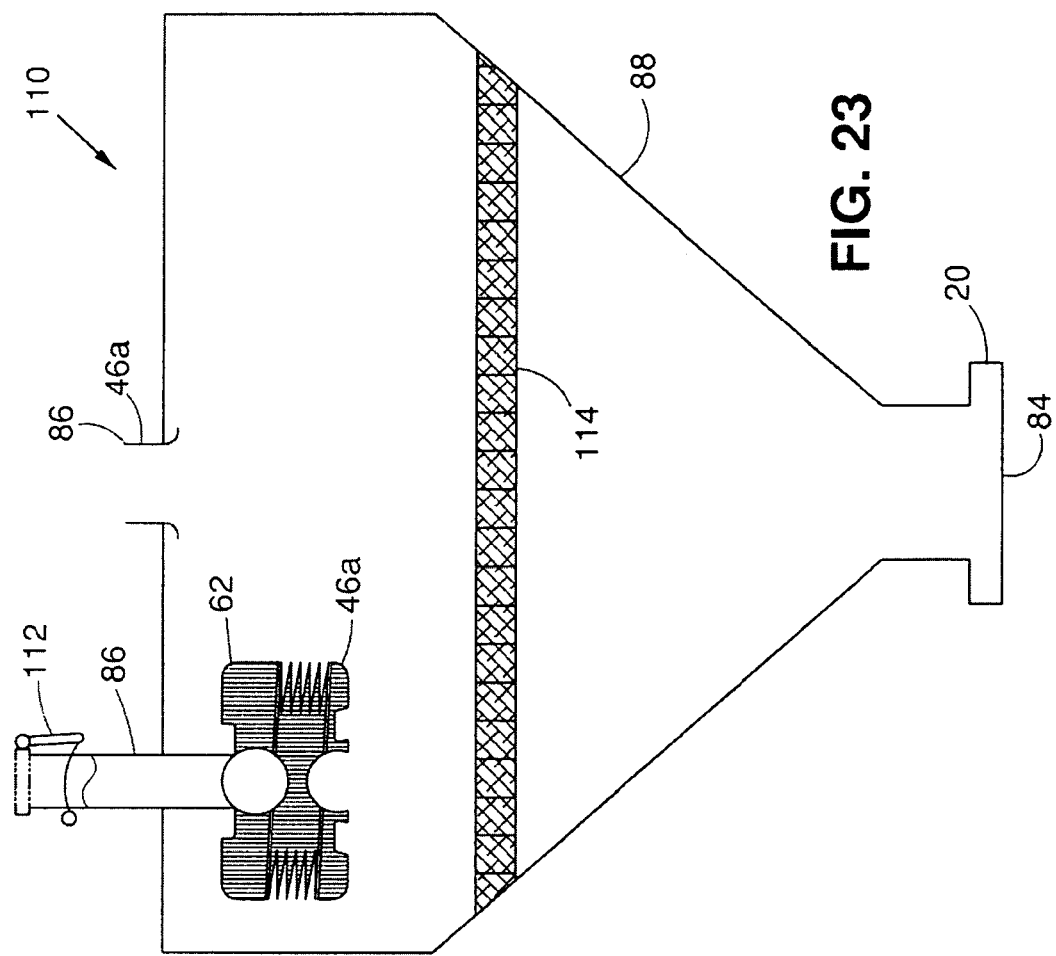
FIG. 23 is a schematic drawing of yet another air purge device.
Figure 24:
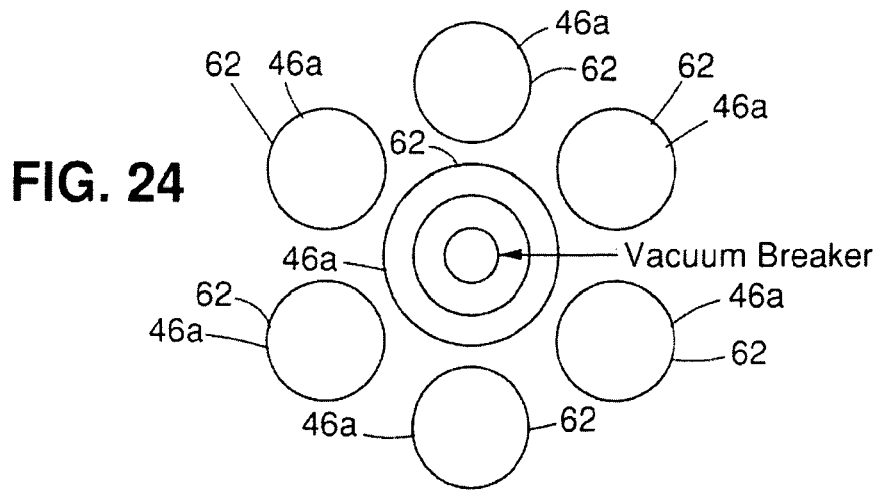
FIG. 24 is a schematic drawing of a layout of valved orifices for the air purge device of FIG. 23.

Referring to FIGS. 23 and 24, high volume power air purge device 110 is another embodiment of an air purge device. Air purge device 110 can include a housing 88 which widens from inlet 84 and includes a screen mesh impingement plate 114. A series of valved orifices 46a or valve member 62, for example, seven (FIG. 24) can be positioned within the housing 88 and each can have outlets 86 extending from the housing 88 for venting air to the atmosphere or a drain. Each outlet 86 can include a trip trap safety flap 112 which can be manual or automatic, to serve as a fail closed back up device. The center valve member 62 can serve as a vacuum breaker which can be activated to cool top vents to break vacuum in housing 88.

Figure 25:
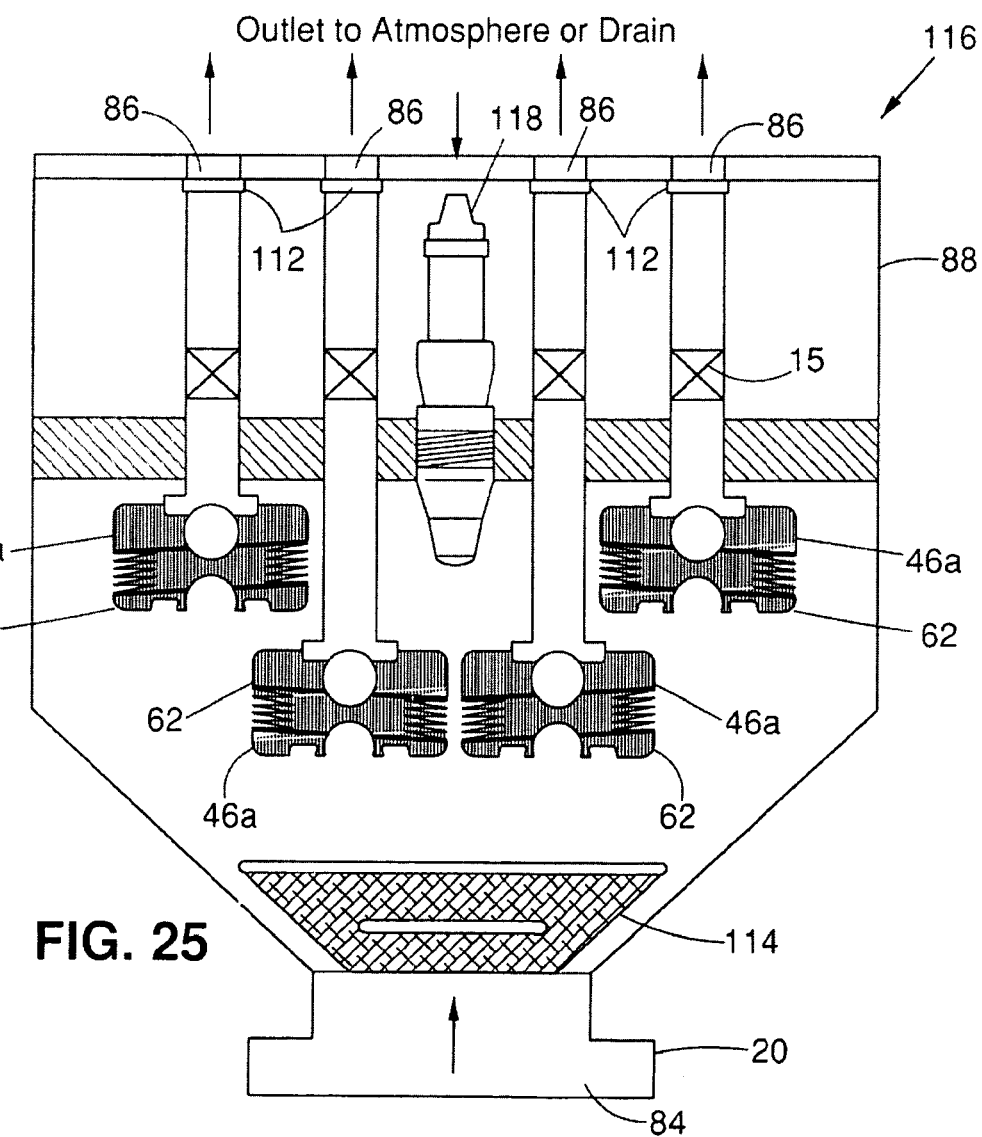
FIG. 25 is a schematic drawing of another air purge device.

Referring to FIG. 25, high volume power air purge device 116 is another air purge device which differs from air purge device 110 in that screen mesh impingement plate 114 is positioned closer to inlet 84. The valved orifices 46a can be positioned at different longitudinal positions and the outlets 86 can include manual isolation valves 15 for closing the outlets 86. A vacuum breaker 118 can be positioned in the center. The vacuum breaker 118 can be set at 5 inches Hg. The valve members 62 can be hammer and debris resistant, and can fail open or closed.

The valved orifices 46a of the high volume power air purge devices, for example, devices 80, 100, 110 and 116, can all be configured to fail closed. In some situations, some or all valved orifices 46a can fail open.

Figure 26:
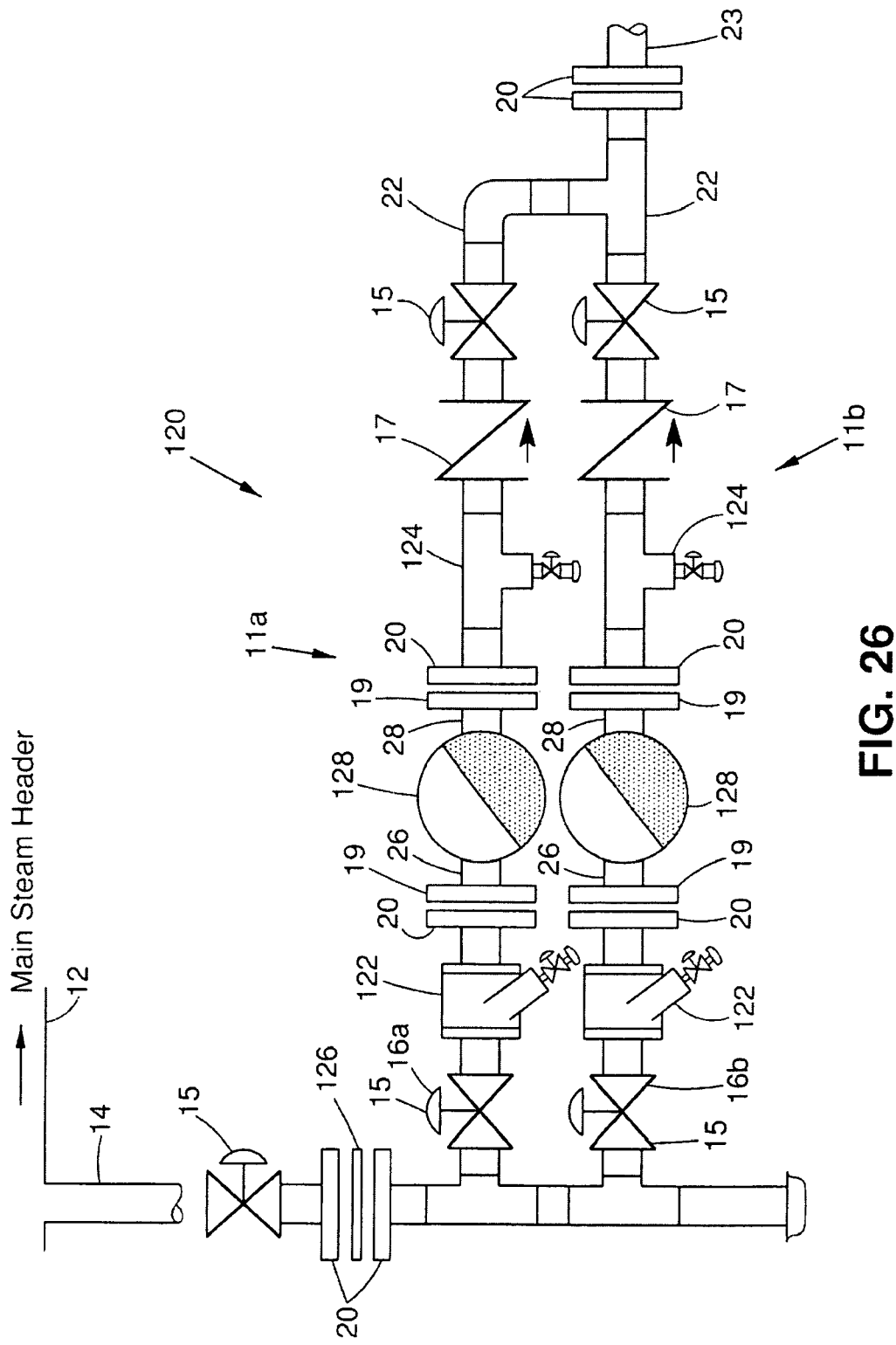
FIG. 26 is a schematic drawing of another embodiment of a steam trap system.

Referring to FIG. 26, steam trap system 120 is another embodiment of a steam trap system which differs from steam trap system 10 in that steam trap system 120 can include a valve 15 on the vertical line 14. The vertical line 14 can include mounting flanges 20 sealed by a gasket 126 between the valve 15 and the portion of vertical line 14 where legs 11a and 11b are connected. Each leg 11a and 11b can include a Y-strainer 122 between valves 16a or 16b, and steam trap 128. The Y-strainer 122 can include a valve for drainage purposes. The steam trap 128 is a generic designation for any suitable commercially available steam trap and embodiments in the present invention. The steam traps 128 can be mounted to legs 11a and 11b by flanges 19 and 20. Downstream from the steam traps 128, each leg 11a and 11b can also include a Tee fitting 124 having valve for drainage purposes, a check valve 17 and a valve 15. The lines 22 can combine and can be connected to line 23 by flanges 20. Steam trap system 120 can be operated in a similar manner as steam trap system 10 in using valves 16a and 16b to switch operation from one leg to the other 11a or 11b.

Figure 27:
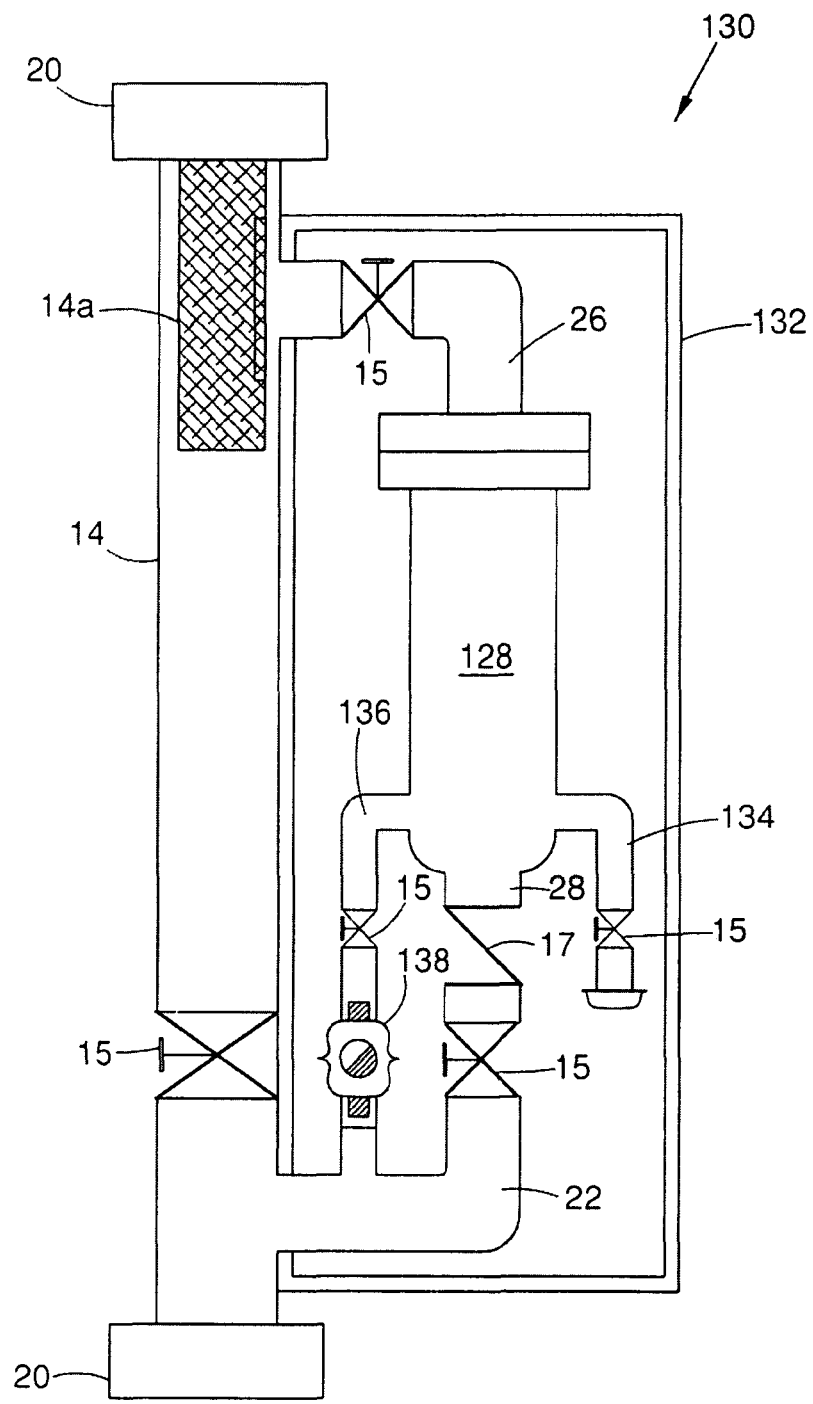
FIG. 27 is a schematic drawing of an embodiment of a steam trap unit.

Referring to FIG. 27, steam trap unit 130 can include a housing or enclosure 132 containing one or more steam traps 128. The inlet 26 of the steam trap 128 can be connected to vertical line 14 by valve 15. The outlet 28 can be connected to line 22 by a check valve 17 and valve 15. Steam trap 128 can include auxiliary outlets 134 and 136 having valves 15. Auxiliary outlet 136 can have an automatic blow down valve 138 for automatically removing dirt, debris, particles or contaminants accumulating in the steam trap 128. Valve 138 can be a thermostatic valve that opens when the contaminated water 34 reaches a predetermined temperature. Alternatively, valve 138 can be operated on a timer or other suitable actuator. Additionally, the particles can be removed by manually opening valve 138 or a valve 15, for example connecting steam trap unit 130 with vertical line 14. The valve 15 can be connected to outlet 136 and/or line 22. The steam trap unit 130 can be mounted to or can be adjacent to vertical line 14.

Figure 28:
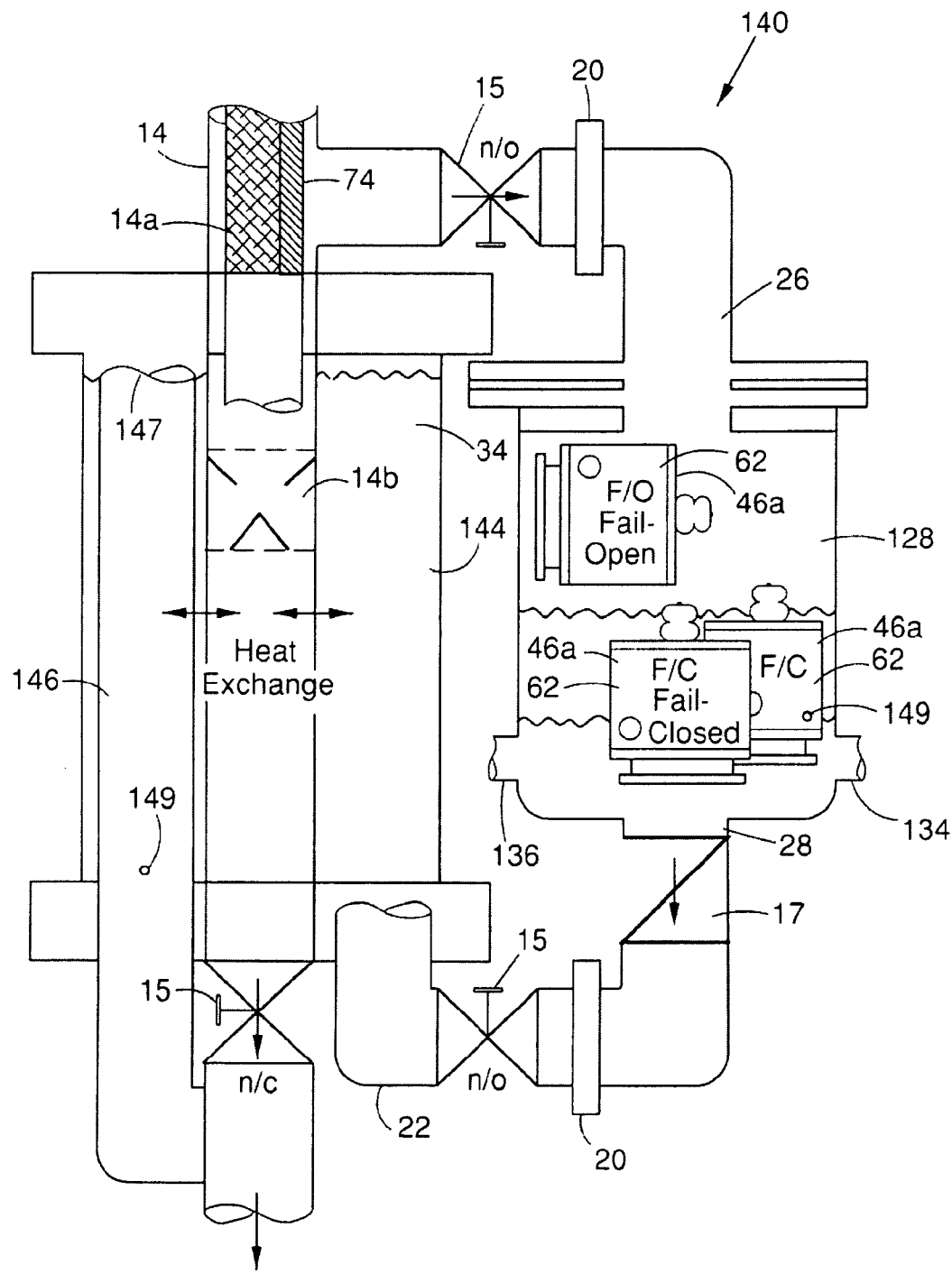
FIG. 28 is another embodiment of a steam trap unit.

Referring to FIG. 28, steam trap unit 140 can be similar to steam trap unit 130 and can include a water hammer protection structure 74, which can be a curved impingement plate positioned within vertical line 14 at the location where the inlet 26 of steam trap 128 is connected to vertical line 14 by valve 15. Vertical line 14 can include one or more debris or sediment collectors 14b, and can be adjacent to or surrounded by a water reservoir 144 for providing heat exchange between vertical line 14 and water reservoir 144. The water 34 in the reservoir 144 can remove heat from and cool steam and condensate entering steam trap 128, which can reduce or prevent flash steam when flowing to a lower pressure region, for example, when passing through valved orifices 46a of the steam trap 128. Reducing or preventing flash steam can reduce wear, erosion and/or corrosion of components such as the valved orifices 46a. The reservoir 144 can be generally annular in shape and can be filled by line 22, or by other suitable means. A drain line 146 having an inlet 147 positioned at the desired water level height can drain water 34 from the reservoir 144 and maintain a constant water level height. Drain line 146 can be connected to vertical line 14. The reservoir 144 can include a weep hole or valved drain 149, which can be bimetallically operated, for draining water 34, for example, before the freezing point. The steam strap 128 can also have a weep hole 149 for similar purposes. The steam trap 128 can include an upper or top valve member 62 that is positioned sideways or laterally, and set or configured for removing only noncondensable gases, for example, air and other gases formed by reactions between steam and air. Outlet 136 can be connected to a whistle, in which at least one valved orifice 46a, for example, the top one, can fail open and activate the whistle for providing an audible indication of failure.

Figure 29:
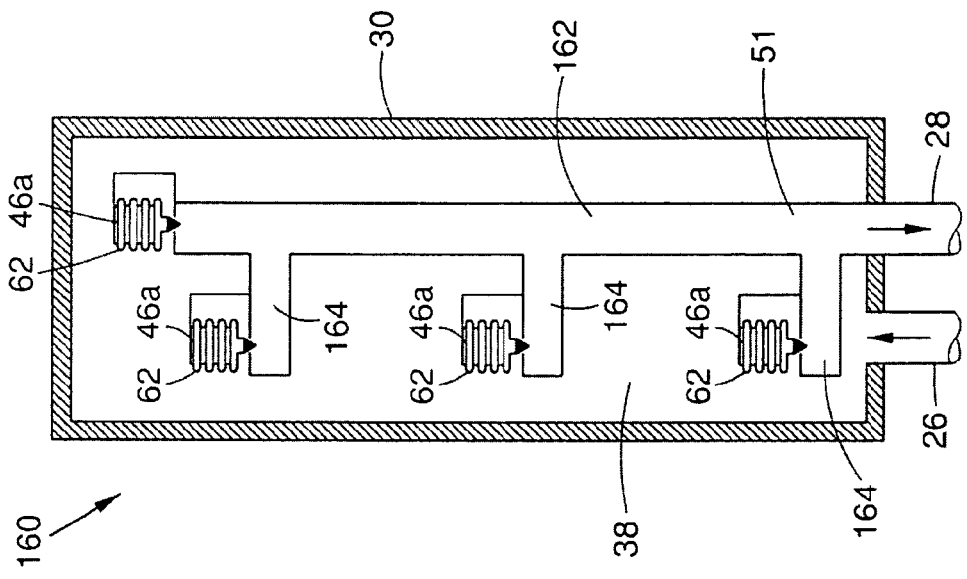
FIGS. 29-32 are side sectional drawings of other embodiments of steam traps in the present invention.

Referring to FIG. 29 steam trap 150 is another embodiment of a steam trap having a housing 30 with flanges 19 at the inlet 26 and outlet 28. An orifice arrangement or member 152 extends from the inlet 26 and includes a series of valved orifices 46a or valve members 62 positioned within the interior 152a of the orifice member 152. The orifice member 152 can be generally cup shaped or cylindrically tubular, and can be centrally positioned.

The lower valve members 62, for example two, can be positioned in an upright orientation for draining water, and air and/or noncondensable gases, and the top or upper valve member can be positioned in a lateral or sideways orientation and set or configured for exhausting only air and/or noncondensable gases. Elbows 60 and/or straight nipples 64 can be employed for mounting or securing the valve members 62 in the desired orientations. As water 34 rises in the water collector 38 within the bottom of the orifice member 152, the water 34 can be remove outwardly from the orifice member 152 through particular or selected valve members 62 that are reached by the water 34. A cylindrical dam 154 can concentrically surround the orifice member 152 to form a generally annular water reservoir 154a in which the water 34 can collect. The water 34 in the reservoir 154a can provide heat exchange with the steam and condensate within the interior of orifice member 152 to draw away heat and reduce or prevent flash steam, where the valved orifices 46a discharge to, or are in contact with reservoir 154a. The water 34 in the reservoir 154a spills over or flows through openings 156 into passage 51 for removal through outlet 28. The dam 154 can maintain a constant level of water 34 within reservoir 154a. The lower valve members 62 can fail closed and the top valve member 62 can fail open.

Figure 30:
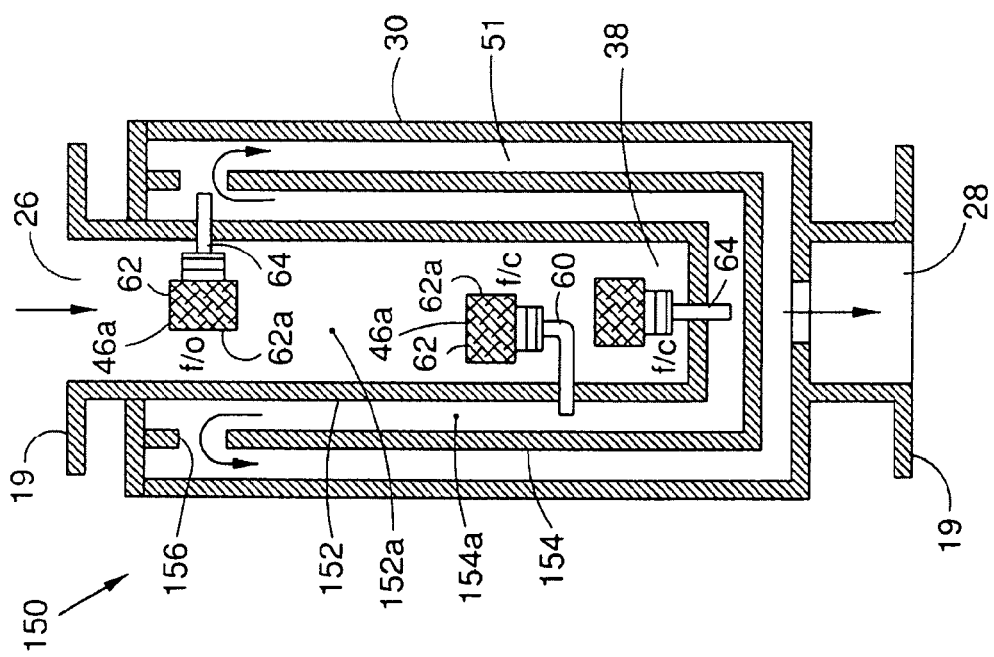

Referring to FIG. 30, steam trap 160 is another steam trap, which can be used for low pressure applications, for example, about 5 or 6 psi in heating radiators. The inlet 26 can enter the housing 30 at the bottom. An orifice arrangement or member 162 can extend upwardly within the water collector 38 and include a series of vertically spaced valved orifices 46a connected to the orifice member 162. Some of the valved orifices 46a can be connected to lateral extensions or portions 164 extending from the orifice member 162. Extensions 164 can include elbows 60 and straight nipples 64. The orifice member 162 can be a vertical pipe or conduit, and can include passage 51, which is connected to outlet 28, extending out the bottom of housing 30. The second valved orifice 46a from the top can fail open and the other valved orifices 46a can fail closed. Alternatively, all valved orifices 46a can fail closed when used with a radiator, merely resulting in the radiator becoming cold so that steam is not wasted. The top two valved orifices 46a can have an orifice 46c with a diameter of large size with a safety factor and set to close at saturated steam temperature. The bottom valved orifices 46a can have orifices 46c that are sized to remove water at a normal working rate or load and set to close a selected amount X degrees below saturated steam temperature. An optional temperature trip device can be included to ensure that all fail closed valved orifices 46a prevent steam loss upon failure. The valved orifices 46a can be positioned at the top and on one side of orifice member 162.

Figure 31:
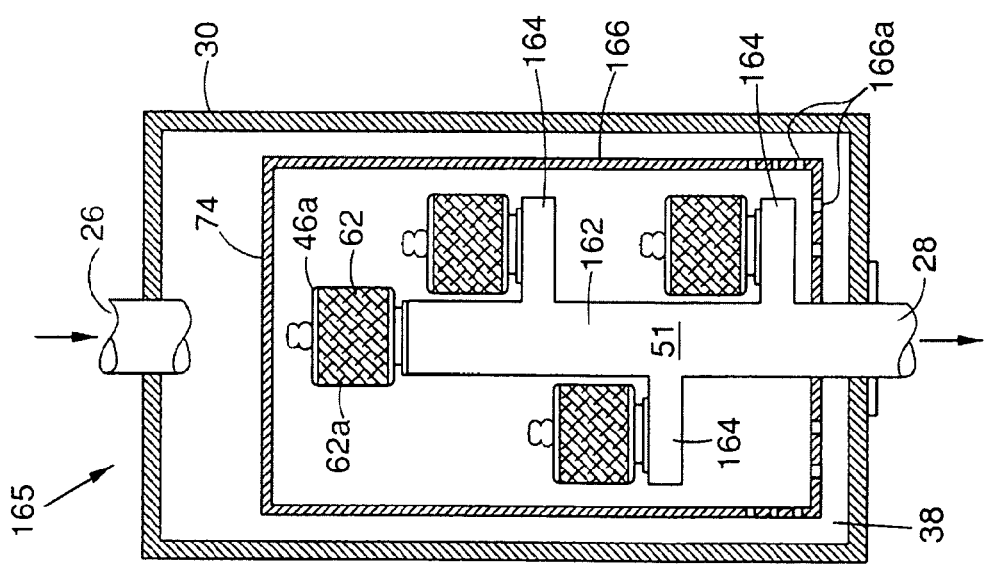

Referring to FIG. 31, steam trap 165 differs from steam trap 160 in that the inlet 26 can be at the top of the housing 30. The valved orifices 46a can be connected to opposite sides of the orifice member 162. The orifice arrangement or member 162 and the valved orifices 46a can be surrounded by an enclosure 166 which can have a water hammer protection structure 74 opposite the inlet 26 for protecting the valved orifices 46a and orifice member 162 from water hammer. The enclosure 166 can be generally cylindrical and include openings 166a for allowing water 34 collecting in the water collector 38 to enter the enclosure 166. The design of steam trap 164 can be dirt resistant.

Figure 32:
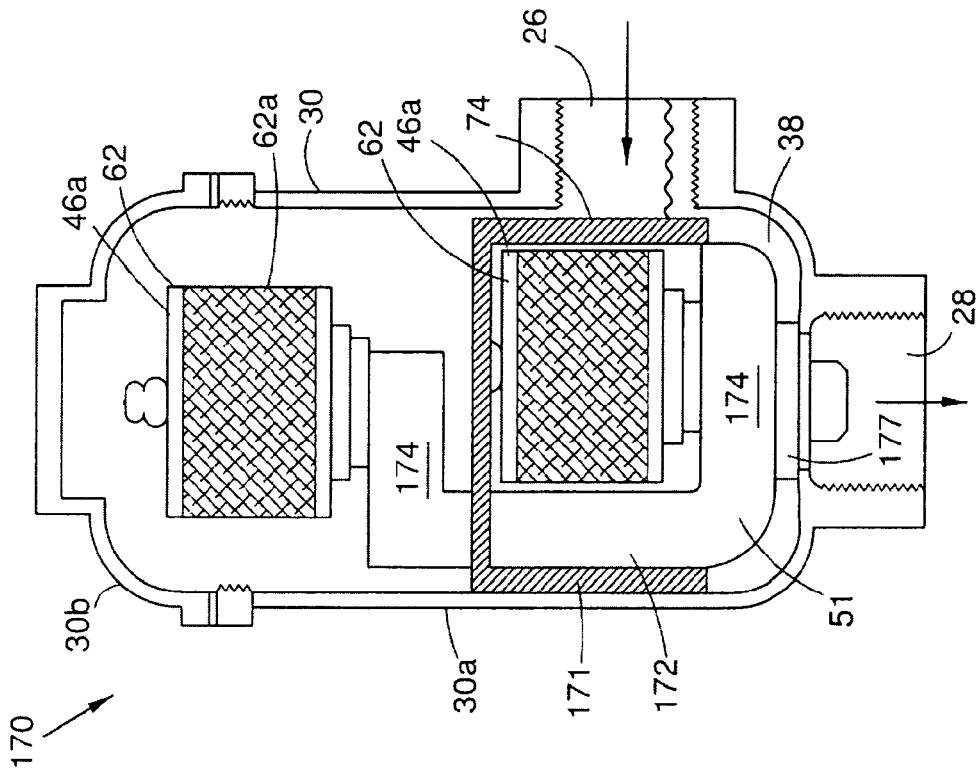

Referring to FIG. 32, steam trap 170 is another embodiment of a steam trap and can also be used for low pressure applications such as heating radiators. The inlet 26 can enter the housing 30 from the side. An orifice arrangement or member 172 can extend upwardly from the water collector 38 within the housing 30 and include two valved orifices 46a. The orifice member 172 can be generally C shaped and include two lateral portions 174 to which a valve member 62 can be connected in an upright orientation. The bottom valve member 62 can be surrounded by an enclosure 171 which can have holes to allow water 34 to enter inside. The holes can be positioned to allow water 34 to enter when the water 34 has reached a certain level. The portion of the enclosure 171 facing the inlet 26 can form a water hammer protection structure 74. The outlet 28 can be in communication with passage 51 or portion 174 at the bottom of the orifice member 172 and can be sealed with a seal 177.

Figures 33, 34:
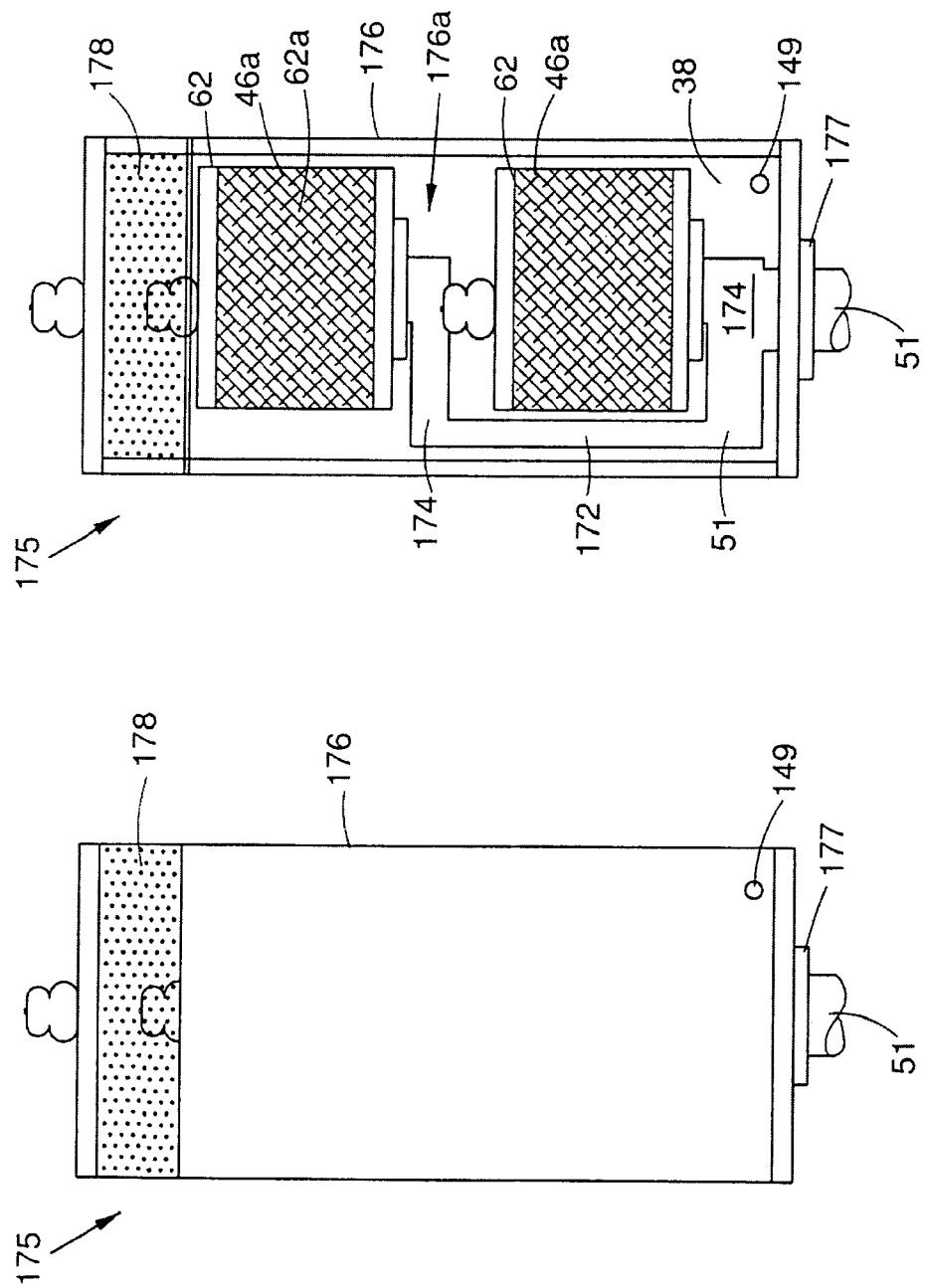
FIG. 33 is a side view of a steam trap module.
FIG. 34 is a side sectional view of the steam trap module of FIG. 33.

Referring to FIGS. 33 and 34, steam trap insert or module 175 can be a disposable or replaceable module that can be employed in steam trap 170, for replacing valved orifices 46a. Module 175 can include an outer housing 176 within which orifice member 172 and valved orifices 46a are contained. The housing 176 can include a mesh or hole region 178, for example, at the top, for allowing water 34 to enter. The bottom of the housing 176 can include a water collector 38, and a weep hole or valved drain 149. Passage 51 can extend from the bottom of housing 176 can be surrounded by a seal 177 for sealing the module 175 within housing 30.

Figure 35:
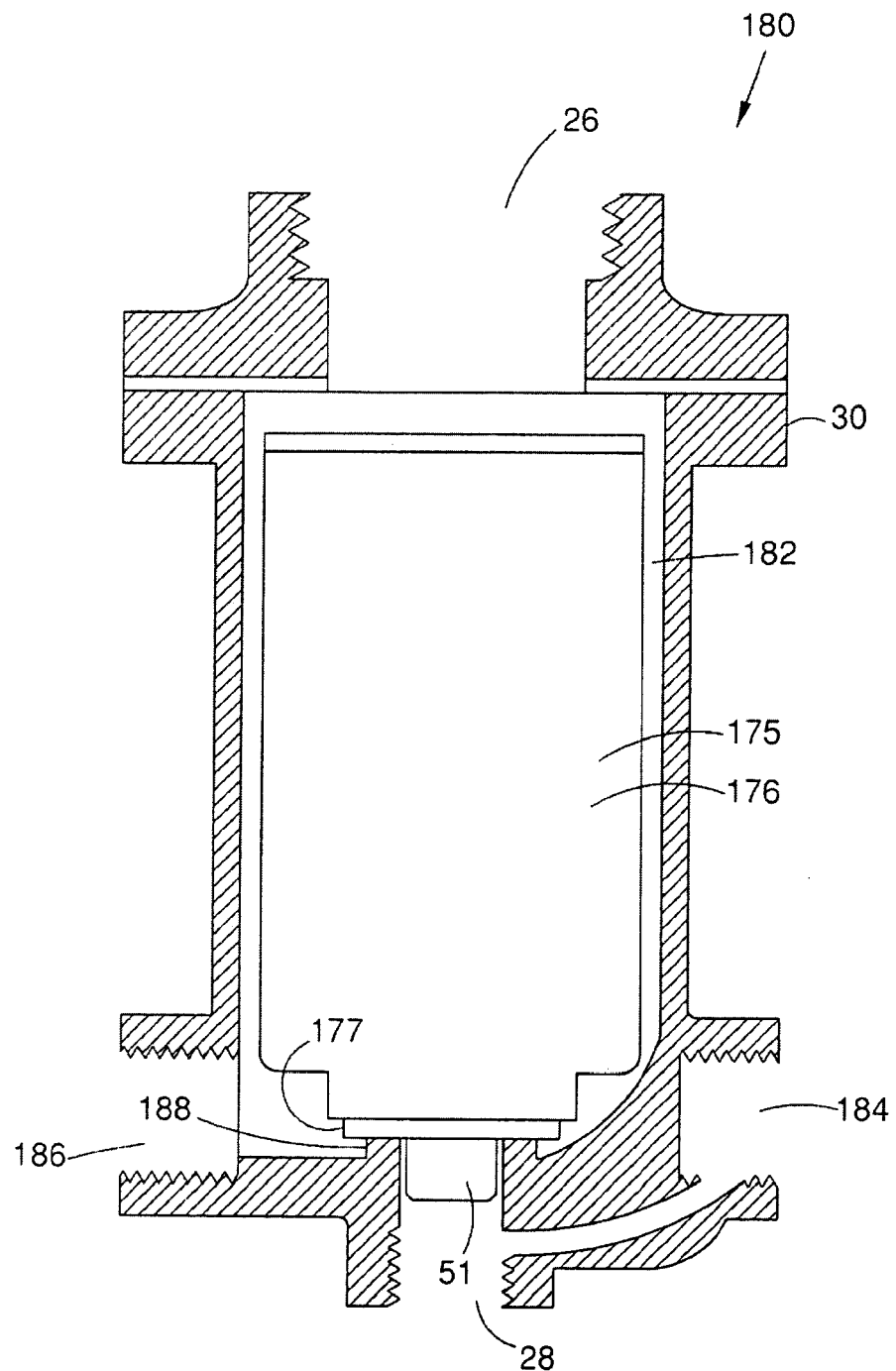
FIGS. 35 and 36 are schematic side sectional views of another steam trap containing an embodiment of a steam trap module.
Figure 36:
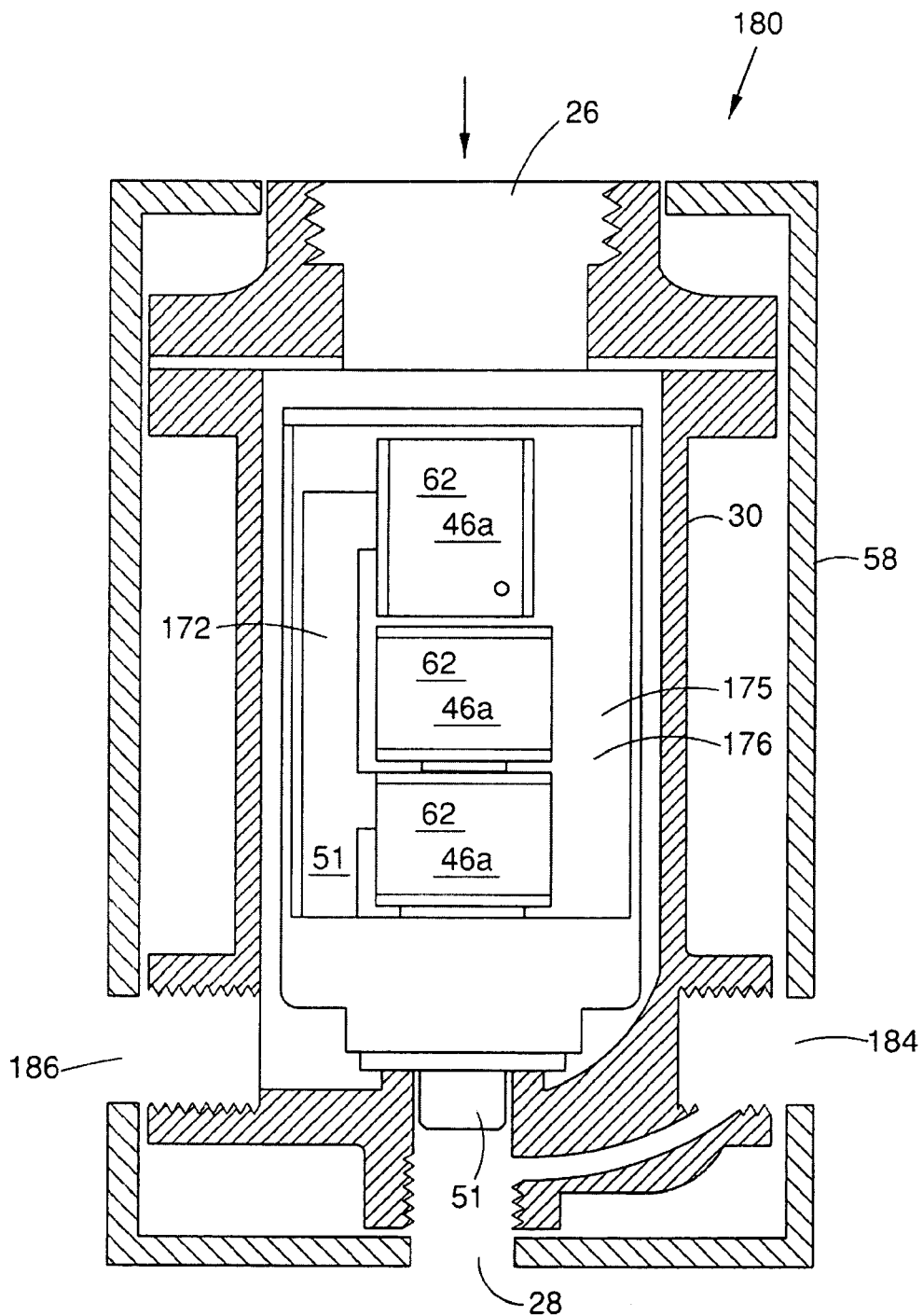

The module 175 can be used with other suitable steam traps, for example, steam trap 180, seen in FIGS. 35 and 36. The seal 177 can engage a seat 188 to seal the module 175 within the interior 182 of the housing 30. The inlet 26 can be at the top of the housing 30, and the outlet 28 can be at the bottom. In addition, auxiliary outlet 184 can be in communication with outlet 28 from the side or laterally, and auxiliary outlet 186 can be in communication with the interior 182 of housing 30. Referring to FIG. 36, an enclosure 58 can surround housing 30. In addition, in some embodiments, the module 175 can include more than two valved orifices 46a, for example, a third valved orifice 46a can be positioned laterally for allowing discharge or passage of air and noncondensable gases. It is understood that module 175 can contain any desired number of valved orifices 46a in desired orientations, and combinations of which valved orifices 46a fail open or closed.

Figure 37:
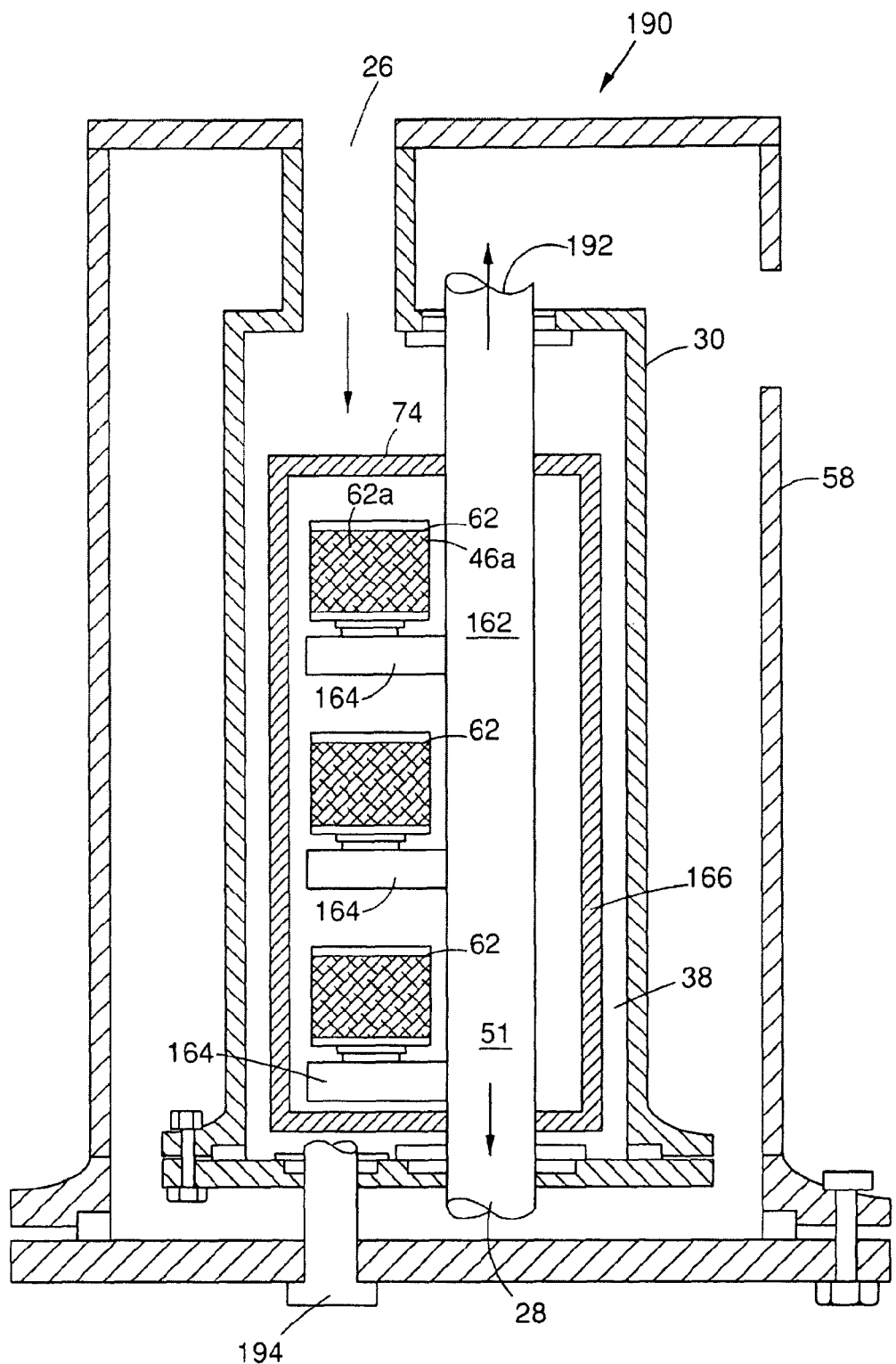
FIG. 37 is a side sectional view of another embodiment of a steam trap.

Referring to FIG. 37, steam trap 190 differs from steam trap 165 in that the valve members 62 are positioned on one side of orifice member 162. Orifice member 162 can extend through the top of housing 50 and can be connected to a whistle 192 to provide an audible alarm of failure. The housing 30 can include an outlet 194 for drainage purposes. An enclosure 58 can surround the housing 30.

Some or all of the components of the steam traps and air purge devices described, can be made of stainless steel and/or plastic for corrosion resistance.

While this invention has been particularly shown and described with references to example embodiments thereof, it will be understood by those skilled in the art that various changes in form and details may be made therein without departing from the scope of the invention encompassed by the appended claims.

For example, components of the steam traps do not have to be round, but can be of other suitable shapes, and orientations, for example, rectangular or square. In addition, the orifice members can also have other suitable shapes, orientations and configurations than shown. Various features of the embodiments shown and described can be combined together or omitted. The steam traps and associated components can be disposable, or portions thereof. Any of the steam traps described, as well as other commercially available steam traps can be used in the steam trap systems of the present invention. The steam trap systems and steam traps can use bar code or RFID tags for easy scheduled maintenance. For marine environments, condensate or water reservoirs can include a floating plate which reduces or prevents water from sloshing around.

What is claimed is:

1. A steam trap system comprising:
   a. a steam trap having an inlet;
   b. a water collector for collecting water;
   c. an orifice arrangement having a plurality of valved orifices spaced apart from each other at different heights, selected valved orifices configured to open as water in the water collector rises and reaches the height of said selected valved orifices allowing the water to be removed from the water collector;
   d. wherein each said valved orifice includes a filter; and,
   e. wherein each said valved orifice includes a thermostatically operated valve member.

2. The steam trap system of claim 1 in which the valved orifices are set to open at predetermined temperatures, the predetermined temperatures increasing with increasing height on the orifice arrangement.

3. The steam trap system of claim 1 in which at least one valved orifice discharges water into a reservoir of water to reduce flash steam.

4. The steam trap system of claim 1 further comprising a heat exchanger for lowering temperature of flow prior to entering the valved orifices.

5. The steam trap system of claim 1 further comprising a water hammer protection structure.

6. The steam trap system of claim 1 in which at least one valved orifice of the plurality of valved orifices has an increased size.

7. The steam trap system of claim 1 in which the valved orifices increase in size moving upwardly.

8. The steam trap system of claim 1 in which at least one valved orifice is configured to fail open.

* * * * *